United States Patent
Chen et al.

(10) Patent No.: US 11,171,698 B2
(45) Date of Patent: Nov. 9, 2021

(54) METHOD AND APPARATUS FOR ANTENNA PARAMETER CONFIGURATION FOR CELLULAR COMMUNICATION SYSTEMS

(71) Applicant: Samsung Electronics Co., Ltd., Suwon-si (KR)

(72) Inventors: Hao Chen, Allen, TX (US); Ahmed Atef Ibrahim Ibrahim, Plano, TX (US); Rebal Jurdi, Allen, TX (US); Zinan Lin, Basking Ridge, NJ (US); Jianhua Mo, Allen, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/076,746

(22) Filed: Oct. 21, 2020

(65) Prior Publication Data

US 2021/0126684 A1   Apr. 29, 2021

Related U.S. Application Data

(60) Provisional application No. 62/926,218, filed on Oct. 25, 2019.

(51) Int. Cl.
*H04B 7/02* (2018.01)
*H04L 1/02* (2006.01)
*H04B 7/0456* (2017.01)

(52) U.S. Cl.
CPC .................. *H04B 7/0482* (2013.01)

(58) Field of Classification Search
CPC ....................................... H04B 7/0482

USPC ......................................... 375/267
See application file for complete search history.

(56) References Cited

U.S. PATENT DOCUMENTS

| | | |
|---|---|---|
| 2008/0298482 A1 | 12/2008 | Rensburg et al. |
| 2017/0208613 A1 | 7/2017 | Nam et al. |
| 2017/0347358 A1 | 11/2017 | Raghavan et al. |
| 2018/0367270 A1 | 12/2018 | Raghavan et al. |
| 2019/0207656 A1* | 7/2019 | Hlander ............... H04L 5/0048 |

(Continued)

FOREIGN PATENT DOCUMENTS

WO   2018/141869 A1   8/2018

OTHER PUBLICATIONS

International Search Report dated Jan. 29, 2021 in connection with International Patent Application No. PCT/KR2020/014623, 4 pages.

*Primary Examiner* — Tanmay K Shah

(57) ABSTRACT

A method and apparatus of a BS in a wireless communication system is provided. The method and apparatus comprises: storing a set of beam codebooks including a plurality of angular grids each of which is identified as a first type of angular grid or a second type of angular grid; identifying a set of parameters to adjust an antenna beam pattern based on the set of beam codebooks, wherein the set of parameters includes at least one of feedback information received from a UE or a set of KPIs identified by the BS; determining a type of angular grid as the first type of angular grid or the second type of angular grid, wherein the first and second type of angular grids include a first antenna gain and a second antenna gain, respectively; and select, from the set of beam codebooks, a beam codebook corresponding to the antenna beam pattern.

20 Claims, 20 Drawing Sheets

(56) References Cited

U.S. PATENT DOCUMENTS

2019/0349045 A1 11/2019 Varatharaajan et al.
2020/0336191 A1* 10/2020 Wigren ................ H04B 7/0632

* cited by examiner

METHOD AND APPARATUS FOR ANTENNA PARAMETER CONFIGURATION FOR CELLULAR COMMUNICATION SYSTEMS

CROSS-REFERENCE TO RELATED APPLICATIONS AND CLAIM OF PRIORITY

The present application claims priority to U.S. Provisional Patent Application Ser. No. 62/926,218, filed on Oct. 25, 2019. The content of the above-identified patent document is incorporated herein by reference.

TECHNICAL FIELD

The present disclosure relates generally to wireless communication systems and, more specifically, the present disclosure relates to an antenna parameter configuration for cellular communication systems.

BACKGROUND

Massive multi-input and multi-out (MIMO) units (MMUs) are much more expensive than legacy remote units (RUs). Although MMUs enable massive MIMO benefits for long term evolution (LTE) release-10 and later user, most of the user equipment that are available in the market are LTE release-8 users who only support transmission mode 4 (TM4) with one-dimensional precoding matrix indicator (PMI) feedback. Therefore, it is important to provide enhanced user experience for LTE release-8 and earlier users when MMUs are deployed and not only bring the enhancement for LTE release-10 and later users. Dynamic or adaptive broadcast beam or common beam for transmitting cell specific reference signal (CRS) is needed to improve the performance of TM4 users. The broadcast beam could be used to send the CRS signals.

SUMMARY

The present disclosure relates to wireless communication systems and, more specifically, the present disclosure relates an antenna parameter configuration for cellular communication systems.

In one embodiment, a base station (BS) in a wireless communication system is provided. The BS comprises a transceiver and a memory operably connected to the transceiver, the memory configured to store a set of beam codebooks including a plurality of angular grids each of which is identified as a first type of angular grid or a second type of angular grid based on a cell angular domain of a cell belonging to the BS. The BS further comprises a processor operably connected to the transceiver and the memory, the processor configured to: identify a set of parameters to adjust an antenna beam pattern based on the set of beam codebooks, wherein the set of parameters includes at least one of feedback information received from a user equipment (UE) or a set of key performance indicators (KPIs) identified by the BS; determine, based on the set of parameters, a type of angular grid as the first type of angular grid or the second type of angular grid, wherein the first and second type of angular grids include a first antenna gain and a second antenna gain, respectively; and select a beam codebook, based on the type of angular grid, from the set of beam codebooks, the beam codebook corresponding to the antenna beam pattern.

In another embodiment, a method of a base station in a wireless communication system is provided. The method comprises: storing a set of beam codebooks including a plurality of angular grids each of which is identified as a first type of angular grid or a second type of angular grid based on a cell angular domain of a cell belonging to the BS; identifying a set of parameters to adjust an antenna beam pattern based on the set of beam codebooks, wherein the set of parameters includes at least one of feedback information received from a UE or a set of KPIs identified by the BS; determining, based on the set of parameters, a type of angular grid as the first type of angular grid or the second type of angular grid, wherein the first and second type of angular grids include a first antenna gain and a second antenna gain, respectively; and selecting a beam codebook, based on the type of angular grid, from the set of beam codebooks, the beam codebook corresponding to the antenna beam pattern.

In yet another embodiment, a non-transitory computer-readable medium comprising program code, that when executed by at least one processor, causes an electronic device to: store a set of beam codebooks including a plurality of angular grids each of which is identified as a first type of angular grid or a second type of angular grid based on a cell angular domain of a cell belonging to the BS; identify a set of parameters to adjust an antenna beam pattern based on the set of beam codebooks, wherein the set of parameters includes at least one of feedback information received from a UE or a set of KPIs identified by the BS; determine, based on the set of parameters, a type of angular grid as the first type of angular grid or the second type of angular grid, wherein the first and second type of angular grids include a first antenna gain and a second antenna gain, respectively; and select a beam codebook, based on the type of angular grid, from the set of beam codebooks, the beam codebook corresponding to the antenna beam pattern.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
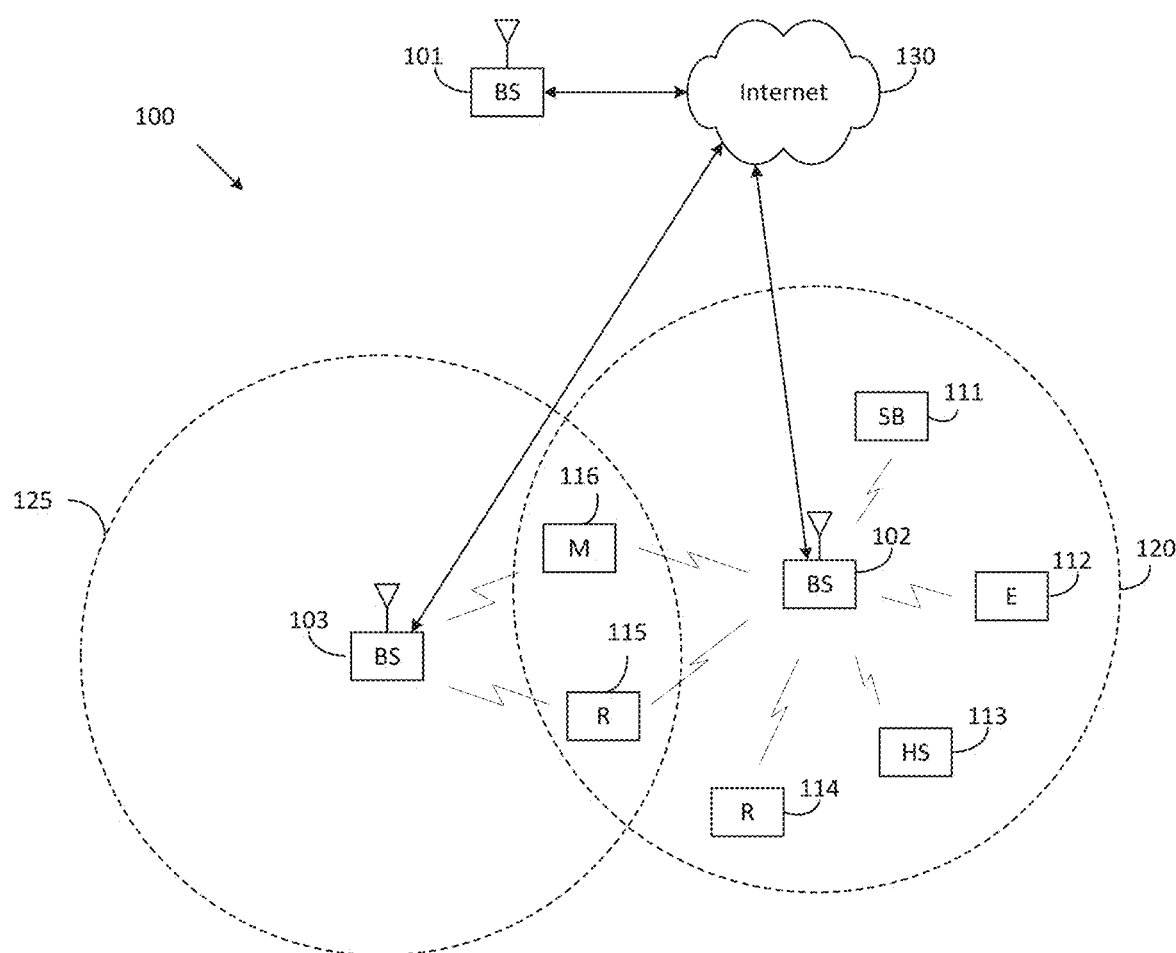
FIG. 1 illustrates an example wireless network according to embodiments of the present disclosure.
Figure 2:
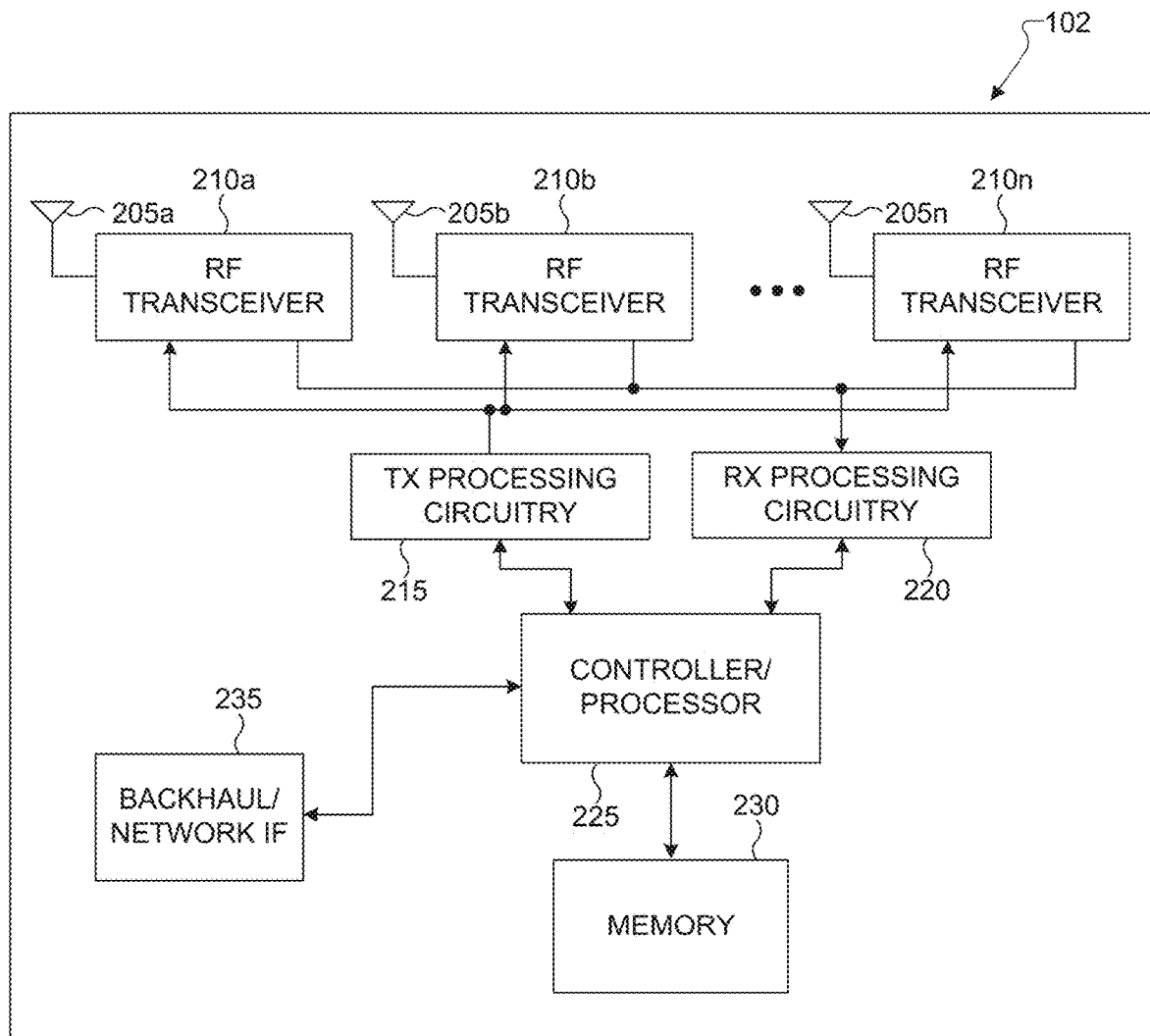
FIG. 2 illustrates an example gNB according to embodiments of the present disclosure.
Figure 3:
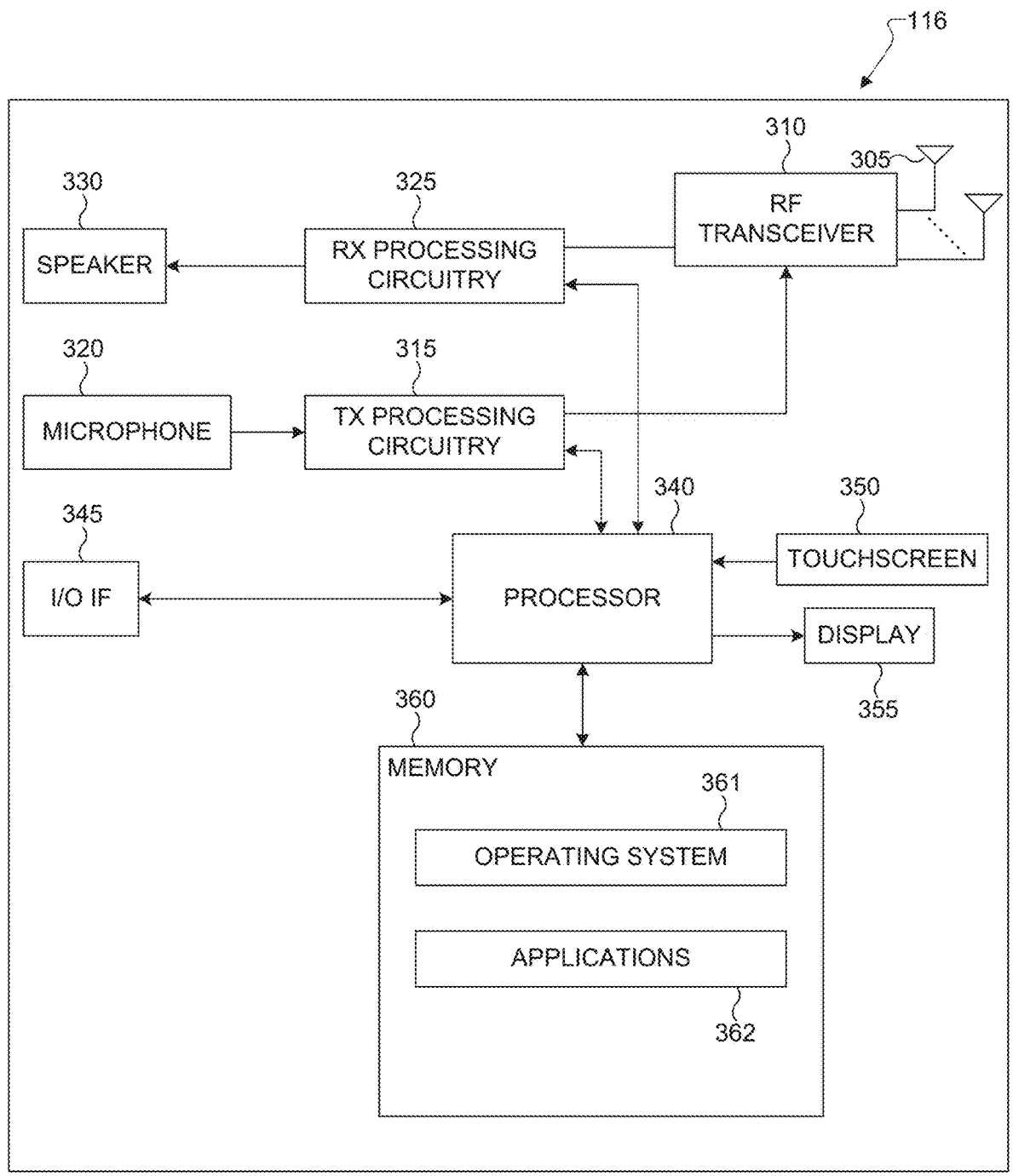
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for antenna parameter configuration for cellular communication systems. In certain embodiments, and one or more of the gNBs 101-103 includes circuitry, programing, or a combination thereof for antenna parameter configuration for cellular communication systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
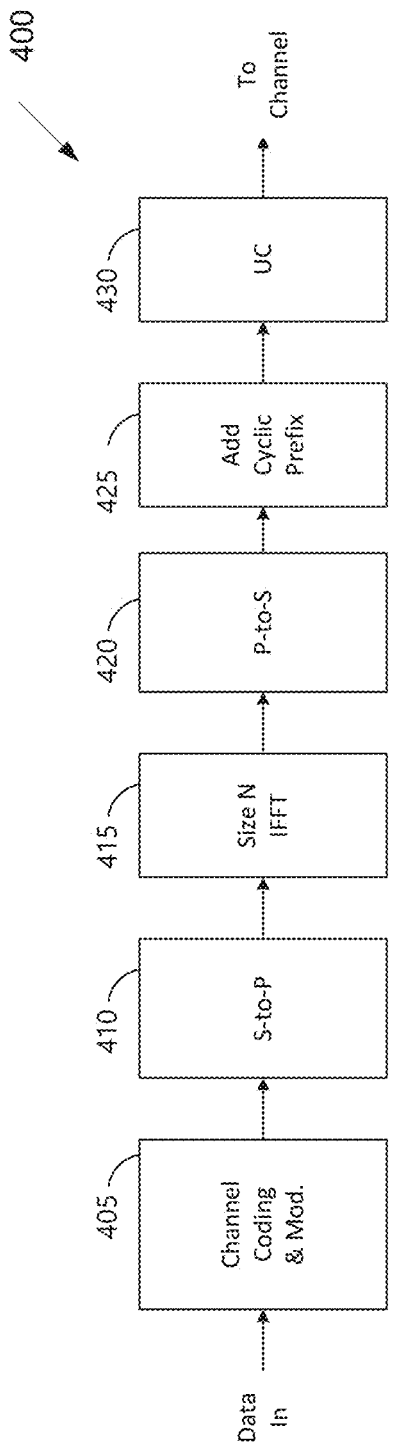
FIGS. 4 and 5 illustrate example wireless transmit and receive paths according to this disclosure.
Figure 5:
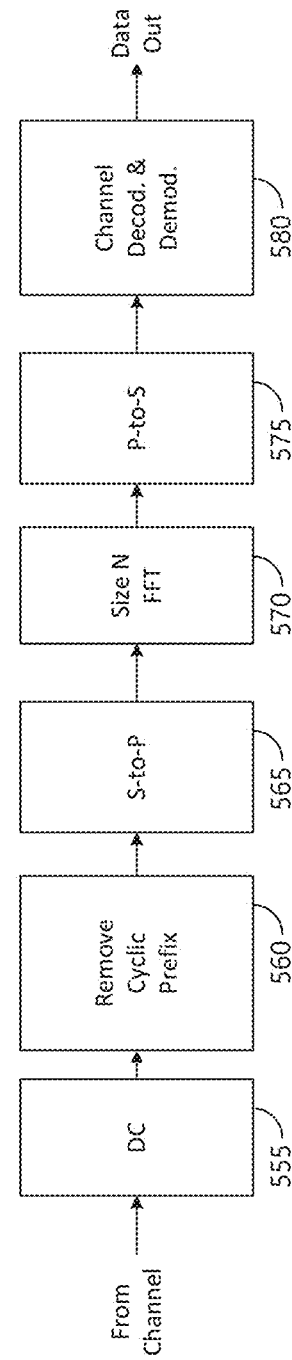

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the antenna parameter configuration for cellular communication systems as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In one embodiment, a selection of the common beam from a predefined beam codebook is provided based on the feedback from UEs. The predefined codebook is generated so that the throughput of connected UEs is improved and coverage of idle UEs are maintained. One method to balance the throughput and coverage would be to divide the cell angular coverage into different angular grid as shown in FIGS. 6A and 6B.

Figure 6A:
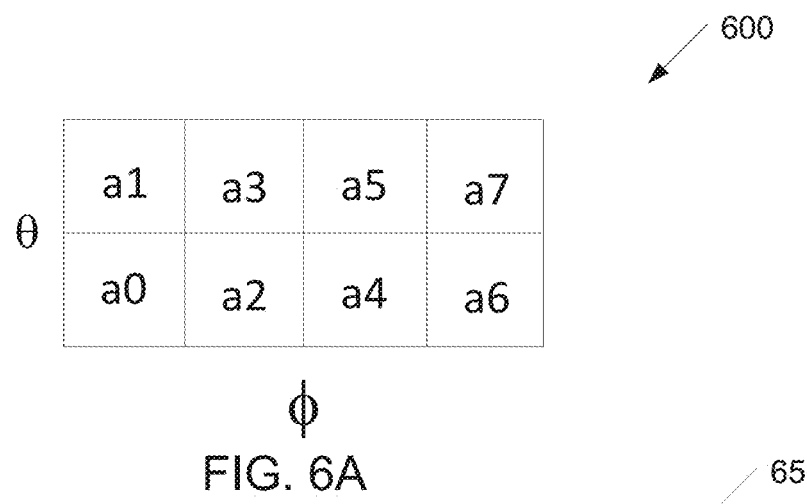
FIG. 6A illustrates an example dividing angular domain into grid according to embodiments of the present disclosure.

FIG. 6A illustrates an example dividing angular domain into grid 600 according to embodiments of the present disclosure. An embodiment of the dividing angular domain into grid 600 shown in FIG. 6A is for illustration only. One or more of the components illustrated in FIG. 6A can be implemented in specialized circuitry configured to perform the noted functions or one or more of the components can be implemented by one or more processors executing instructions to perform the noted functions.

Figure 6B:
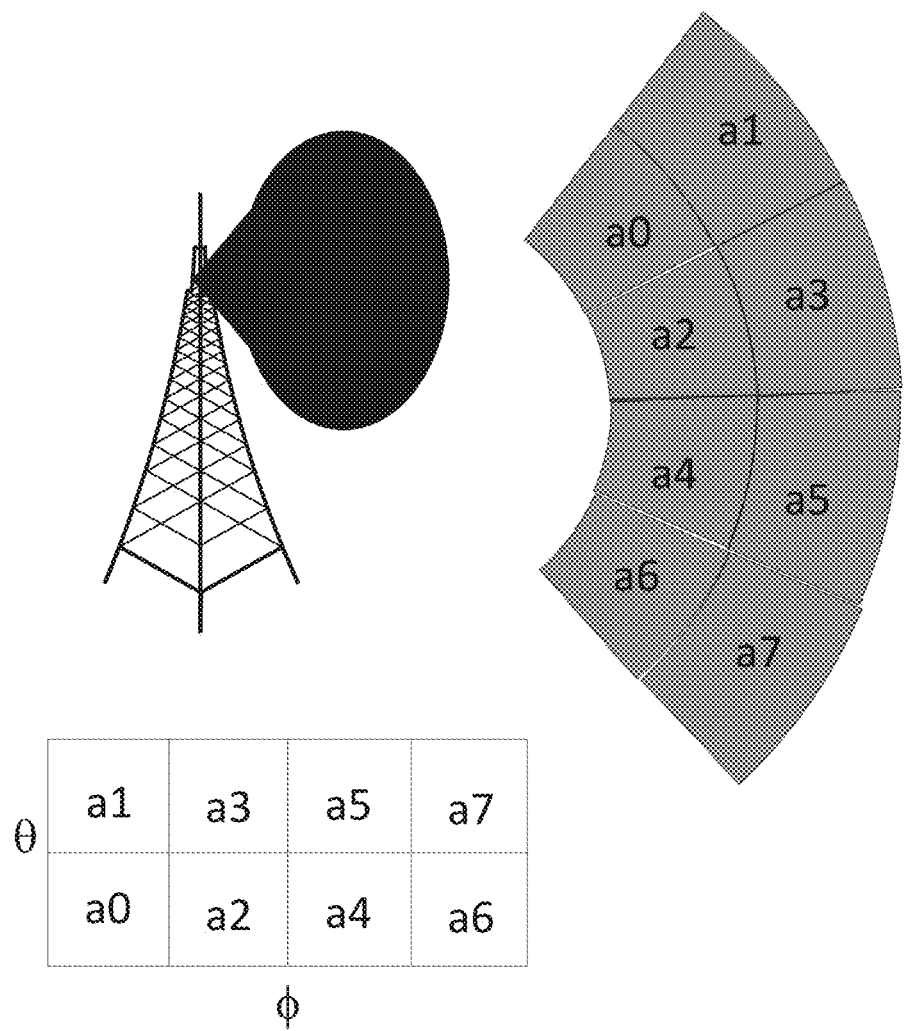
FIG. 6B illustrates an example mapping angular domain into read cell according to embodiments of the present disclosure.

FIG. 6B illustrates an example mapping angular domain into read cell 650 according to embodiments of the present disclosure. An embodiment of the mapping angular domain into read cell 650 shown in FIG. 6B is for illustration only. One or more of the components illustrated in FIG. 6B can be implemented in specialized circuitry configured to perform the noted functions or one or more of the components can be implemented by one or more processors executing instructions to perform the noted functions.

In one embodiment, the predefined cell coverage area is represented by the horizontal angular coverage $\varphi_c$ and vertical angular coverage $\theta_c$. In one example, the horizontal angular coverage could be 120 degrees and the vertical angular coverage could be 10 degrees. The coverage could be the antenna 3 dB or any other gain defined beam width. In the angular space, the cell coverage is divided into different parts. One way to divide is to equally divide the horizontal angular into N equal parts and divide the vertical angular into M equal parts as shown in FIG. 6A. The angular domain angular grid could also be mapped to the cell coverage space as shown in FIG. 6B.

In one embodiment, to guarantee the coverage and to improve the throughput, different weights may be put to different angular grids when synthesizing the antenna beam pattern. For example, weight $w_1$ may be put on angular grid a0, a1 and put weight $w_2$ on other angular grids. Here the weights may be used to synthesize the beam pattern.

In one embodiment, to generate the beam codebook is to synthesize the beam codebook based on different combinations of assigning the weights $w_1$ $w_2$ to the angular grids. Totally if there are MN grids and two weights, the size of the beam codebook could be $2^{MN}$.

Figure 7:
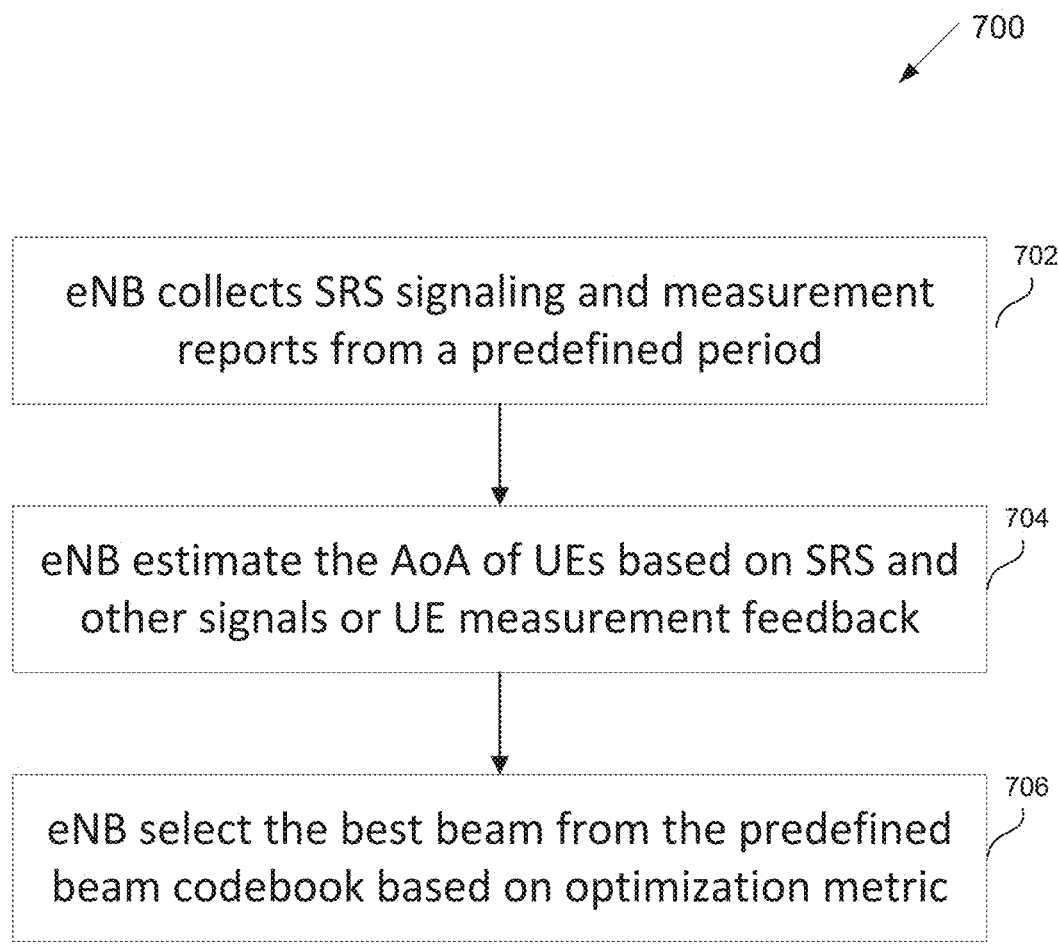
FIG. 7 illustrates a flow chart of a method for online beam selection according to embodiments of the present disclosure.

FIG. 7 illustrates a flow chart of a method 700 for online beam selection according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

In one embodiment, to select the beam from the beam codebook, the angular information identified from sounding reference signal (SRS) is provided. As illustrated in FIG. 7, First, an eNB at step 702 collects SRS signaling from connected UEs for a predefined period T. Second, based on SRS information, the eNB at step 704 identifies the angle of arrivals for all connected UEs. Third, the eNB at step 706 selects the best beam from the beam codebook based on the beam selection metric. These steps are summarized into the following flowchart.

Figure 8:
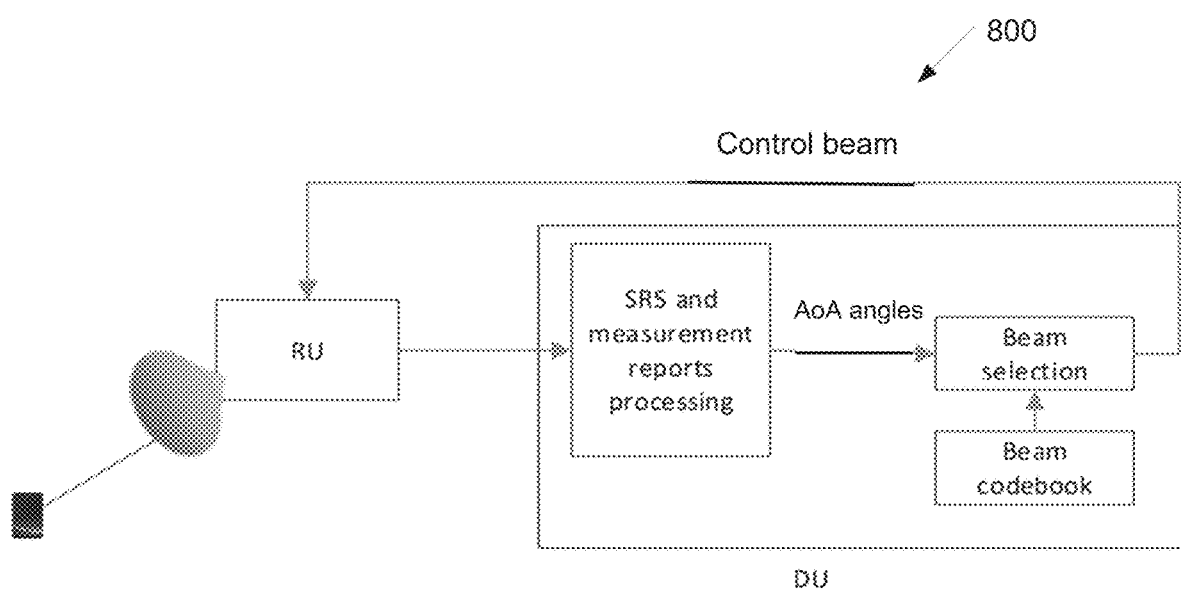
FIG. 8 illustrates an example beam selection according to embodiments of the present disclosure.

FIG. 8 illustrates an example beam selection 800 according to embodiments of the present disclosure. An embodiment of the beam selection 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In the present disclosure, a digital unit (DU) may be considered. After UEs sending SRS and measurement reports to the RU and DU, the DU first call the function in digital signal processing (DSP) to process the SRS and measurement reports so that the angle of arrival (AoA) angular information can be obtained. Then this information may be passed to beam selection module to select a beam from a beam codebook. After that, the selected beam may be sent to RU to configure an antenna configuration.

The network determines a set of beams according to the required spherical coverage area, the UE traffic intensity. During the online beam-selection phase, the beams are looked up and applied.

Figure 9:
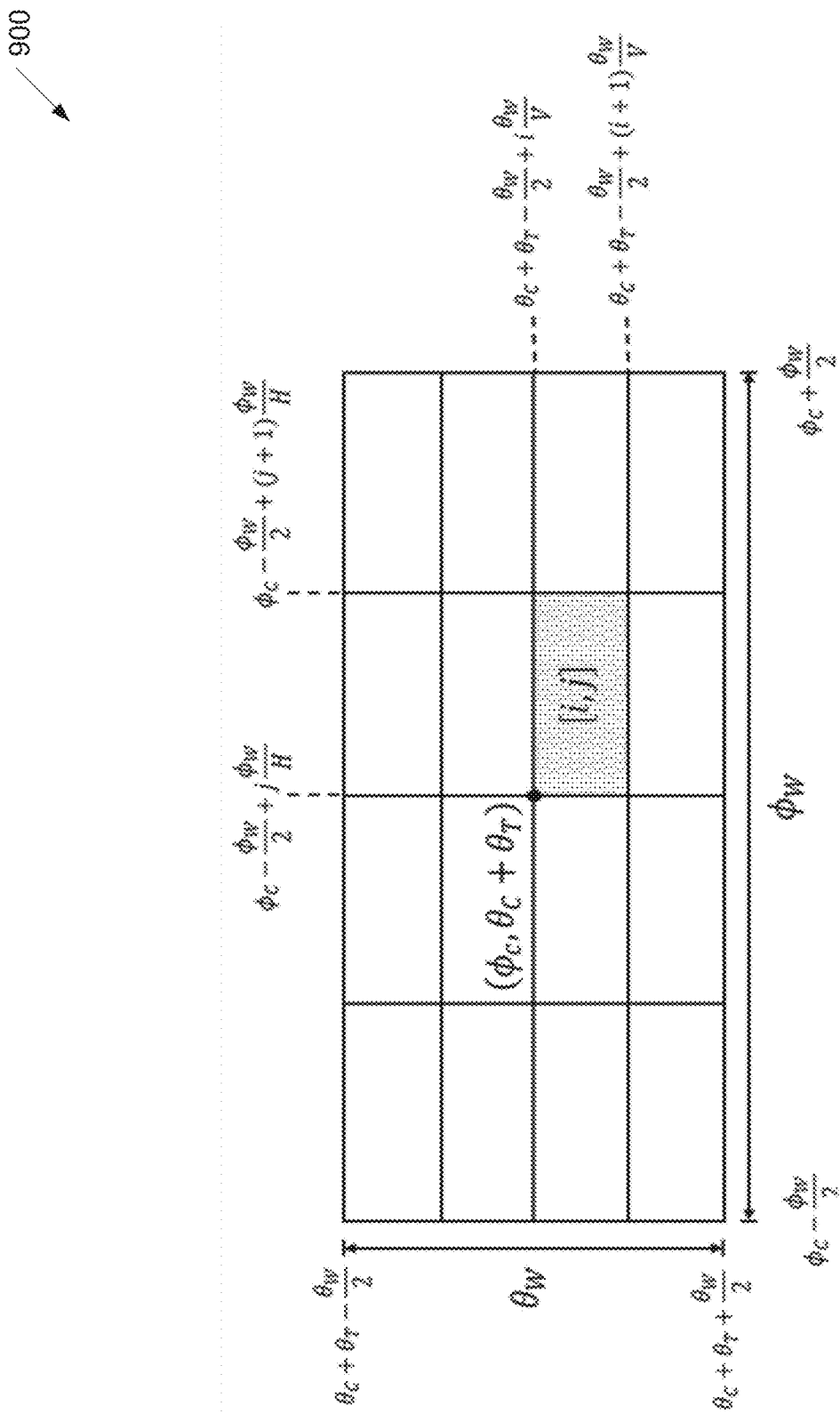
FIG. 9 illustrates an example coverage plane delimited by a spherical region of interest and partitioned into equally-sized rectangles denoting traffic regions according to embodiments of the present disclosure.

FIG. 9 illustrates an example coverage plane 900 delimited by a spherical region of interest and partitioned into equally-sized rectangles denoting traffic regions according to embodiments of the present disclosure. An embodiment of the coverage plane 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In one embodiment, a single beam generation is provided.

In such embodiment, at step 1, the total angular coverage area and the partition of the angular coverage area are identified.

An example of this step is as follows. The spherical coverage plane is set to cover a range of interest $$\left[\theta_C + \theta_T - \frac{\theta_W}{2}, \theta_C + \theta_T + \frac{\theta_W}{2}\right]$$

in the elevation domain and $$\left[\phi_C - \frac{\phi_W}{2}, \phi_C + \frac{\phi_W}{2}\right]$$

in the azimuth domain as illustrated in FIGS. 6A and 6B. The angles $\theta_C$ and $\phi_C$ are referred to as the center (boresight) elevation and azimuth and elevation angles, $\theta_T$ the vertical tilt angle, and $\theta_W$ and $\phi_W$ the vertical and horizontal beamwidths. The coverage plain is partitioned along a grid into V×H rectangles of equal dimensions. Rectangle, 0≤i<V, 0≤j<H covers the range $$\left[\theta_C + \theta_T - \frac{\theta_W}{2} + i\frac{\theta_W}{V}, \theta_C + \theta_T - \frac{\theta_W}{2} + (i+1)\frac{\theta_W}{V}\right]$$

in the elevation domain and the range $$\left[\phi_C - \frac{\phi_W}{2} + j\frac{\phi_W}{H}, \phi_C - \frac{\phi_W}{2} + (j+1)\frac{\phi_W}{H}\right]$$

in the azimuth domain.

In such embodiment, at step 2, the traffic intensity of each angular area is determined. For the example given in FIGS. 6A and 6B, every rectangle corresponds to regions of traffic with varying levels of intensity. It is required that the beam pointing towards regions of higher traffic intensity to exhibit enhanced coverage according to an arbitrary utility. To accomplish this, the coverage plane is encoded with a set of weights that mirror traffic intensity and thus beamforming gain. Weights are directly related to traffic intensity. The encoded coverage plane is referred to as target coverage pattern. For any coverage pattern, a single-beam codebook is generated by running a K-means algorithm to optimize a utility function (e.g., mean throughput or mean logarithmic throughput) of the coverage plane and corresponding weights.

In such embodiment, at step 3, the beam is generated according to the determined spherical coverage and the weights.

In one embodiment, the beam can be designed to maximize the objective function in the form: $\Sigma_i a_i \Sigma_{(\theta_j, \phi_j) \in A_i} f(G(\theta_j, \phi_j))$ where $\{A_i\}$ is the coverage area partition, $\{a_i\}$ are the weights applied to each area according to the traffic density, $f(\cdot)$ is the utility function, and $G(\theta_j, \phi_j)$ is the beamforming gain in the direction $(\theta_j, \phi_j)$. The utility function $f(\cdot)$ can be the data rate, throughput, received reference signal power, etc.

In one embodiment, an alphabet of size n of weights is specified, e.g. $a_i \in \{0, 1, 10\}$, where these weights correspond to regions of different traffic intensities and thus target coverage.

Figure 10:
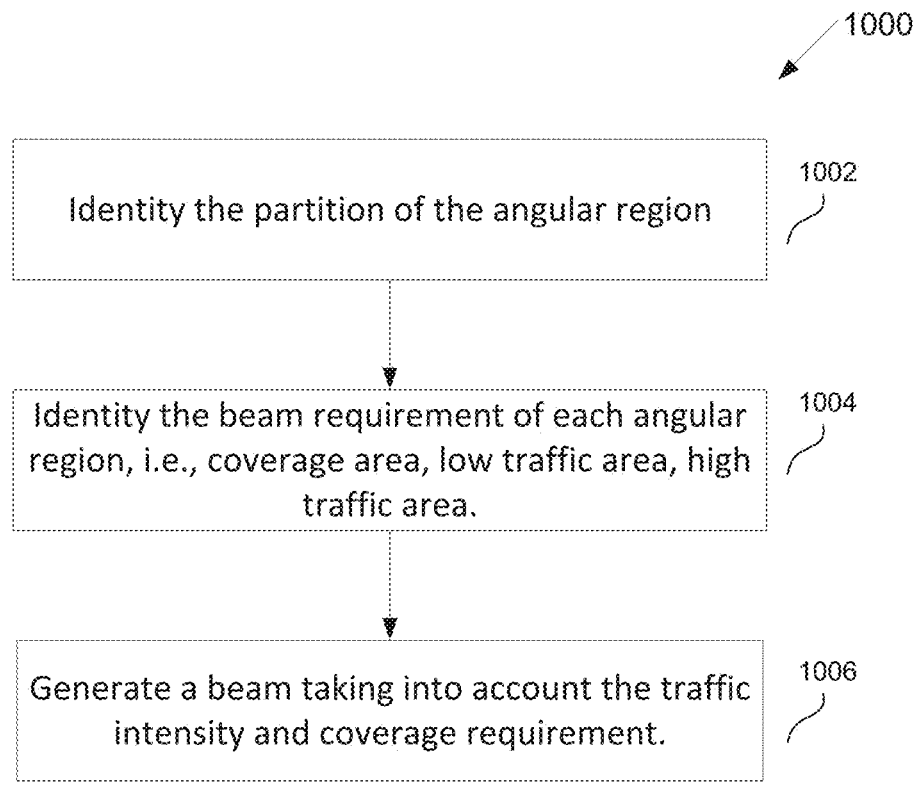
FIG. 10 illustrates a flow chart of a method for a beam generation according to embodiments of the present disclosure.

FIG. 10 illustrates a flow chart of a method 1000 for a beam generation according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. The beam generation procedure is summarized as illustrated in FIG. 10.

In one embodiment, the above process of single beam generation can be repeated to generate all possible $n^{VH}$ beams. These beams are generated offline and cached for quick access.

In another embodiment, if the network only identifies a subset of traffic density distribution and generate the corresponding beams. The network can choose the subset based on the historical knowledge, building location information, etc.

Example simulation results are provided here to illustrate the design procedure. The base station is assumed to have an 8×4 antenna array. The boresight direction is assumed to the ($\theta_0$=90°, $\phi_0$=180°). The down tilting angle $\theta_T$ is 5 degrees.

The required angular coverage area is (90°≤θ≤100°, 135°≤θ≤225°). The whole area is divided into 8 regions. In the following figures, three different cases may be provided.

As illustrated in FIGS. 11-13, 2 regions with high traffic density only are provided. As illustrated in FIGS. 14-16, 2 high-traffic regions and 6 low-traffic regions are provided. As illustrated in FIGS. 14-16, 8 regions with similar traffic intensity is provided.

As illustrated in the aforementioned figures, the provided method can adapt the beam radiation pattern according to both the coverage requirement and traffic intensity.

Figure 11:
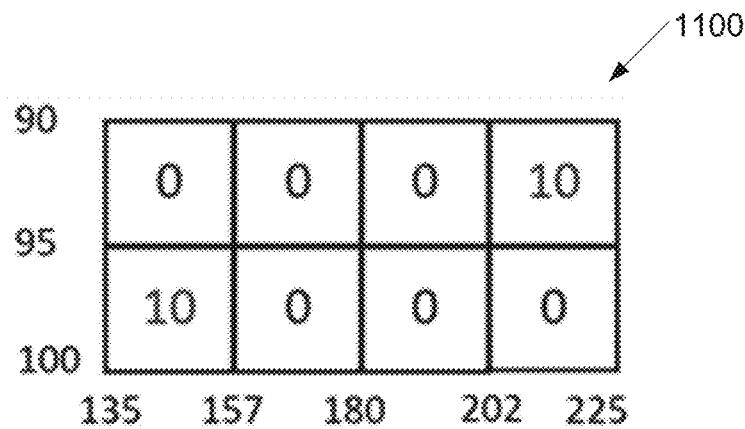
FIG. 11 illustrates an example coverage pattern according to embodiments of the present disclosure.

FIG. 11 illustrates an example coverage pattern 1100 according to embodiments of the present disclosure. An embodiment of the coverage pattern 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

Figure 12:
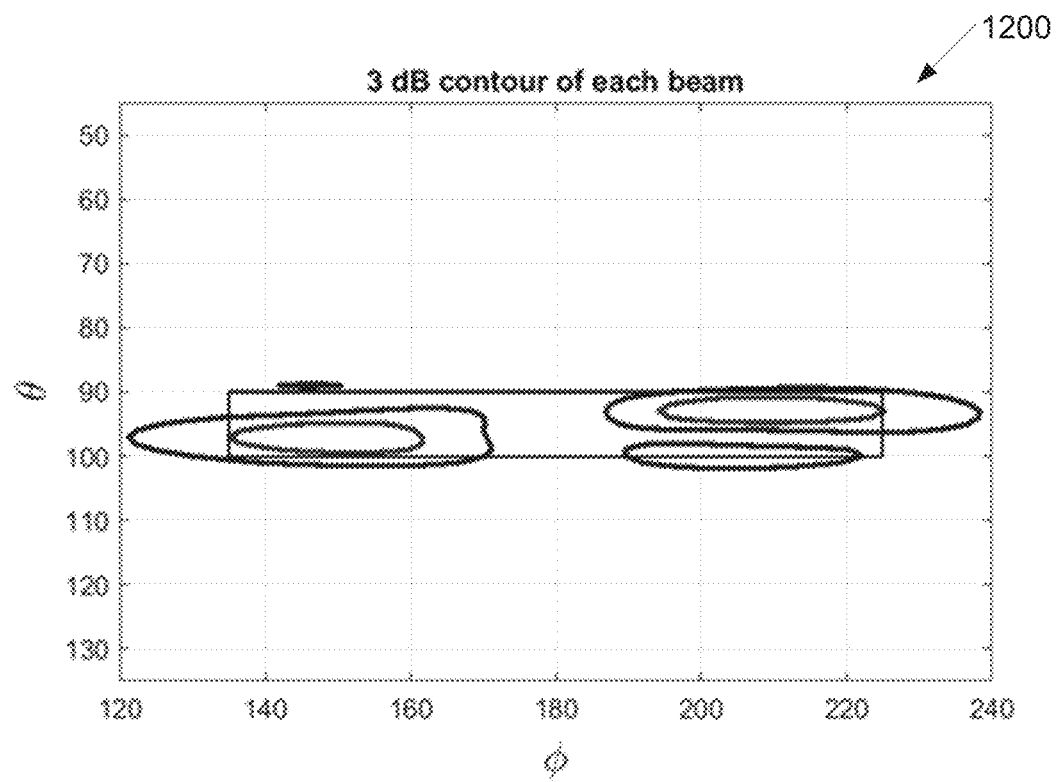
FIG. 12 illustrates an example 3 dB and 9 dB cutoff contours (in red and blue) of the common beam according to embodiments of the present disclosure.

FIG. 12 illustrates an example 3 decibel (dB) and 9 dB cutoff contours (in red and blue) of the common beam 1200 according to embodiments of the present disclosure. An embodiment of the 3 dB and 9 dB cutoff contours (in red and blue) of the common beam 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

Figure 13:
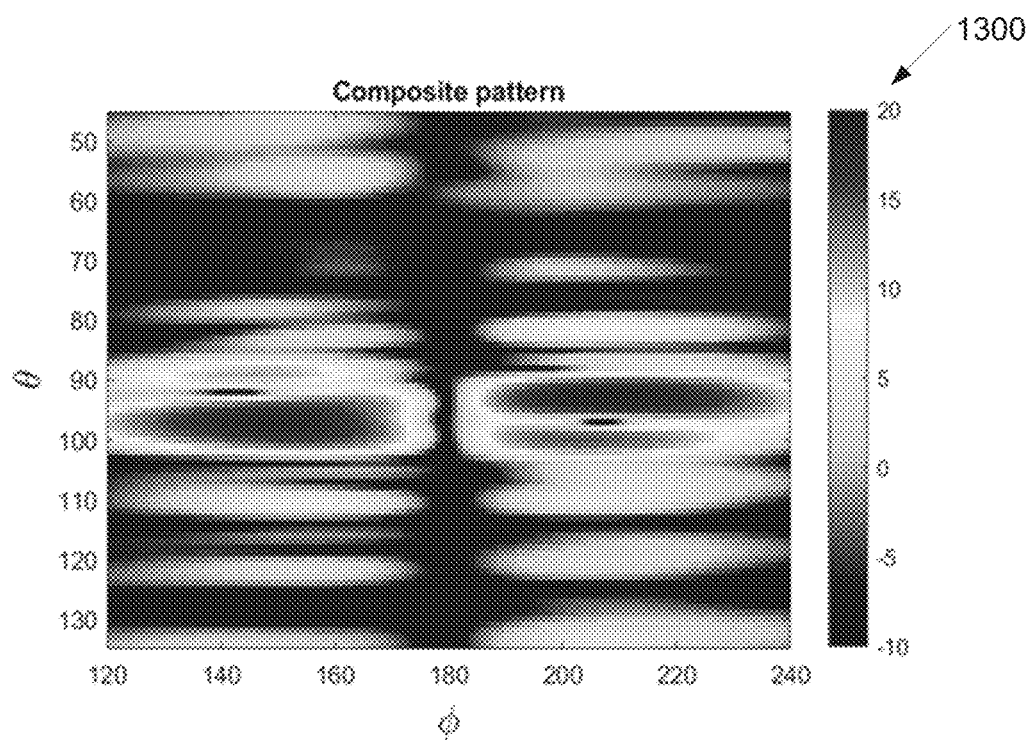
FIG. 13 illustrates an example heat map showing the continuum of coverage based on the target coverage pattern according to embodiments of the present disclosure.

FIG. 13 illustrates an example heat map showing the continuum of coverage based on the target coverage pattern 1300 according to embodiments of the present disclosure. An embodiment of the heat map showing the continuum of coverage based on the target coverage pattern 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

Figure 14:
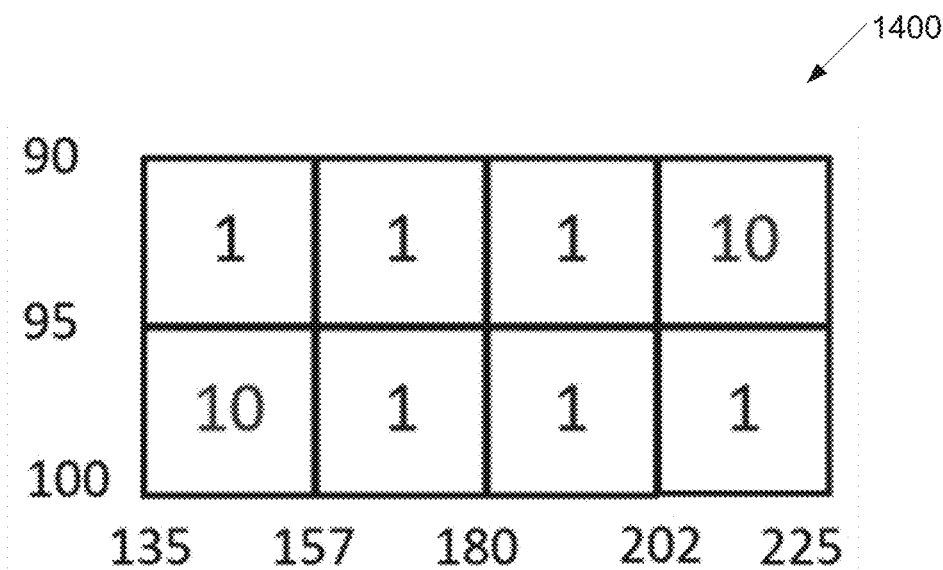
FIG. 14 illustrates an example coverage pattern where low-traffic regions are given small significance according to embodiments of the present disclosure.

FIG. 14 illustrates an example coverage pattern where low-traffic regions are given small significance 1400 according to embodiments of the present disclosure. An embodiment of the coverage pattern where low-traffic regions are given small significance 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

Figure 15:
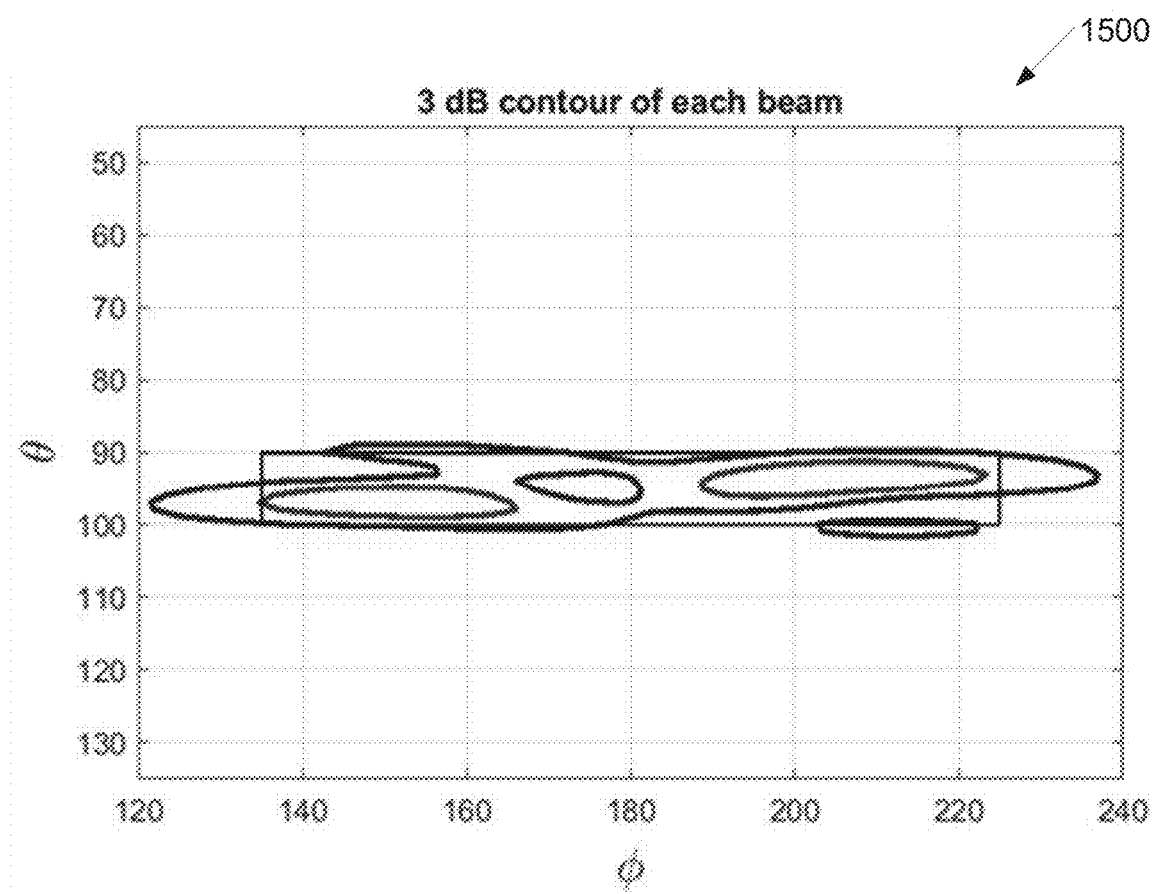
FIG. 15 illustrates an example coverage contours of the beam generated from the target coverage pattern according to embodiments of the present disclosure.

FIG. 15 illustrates an example coverage contours of the beam generated from the target coverage pattern 1500 according to embodiments of the present disclosure. An embodiment of the coverage contours of the beam generated from the target coverage pattern 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

Figure 16:
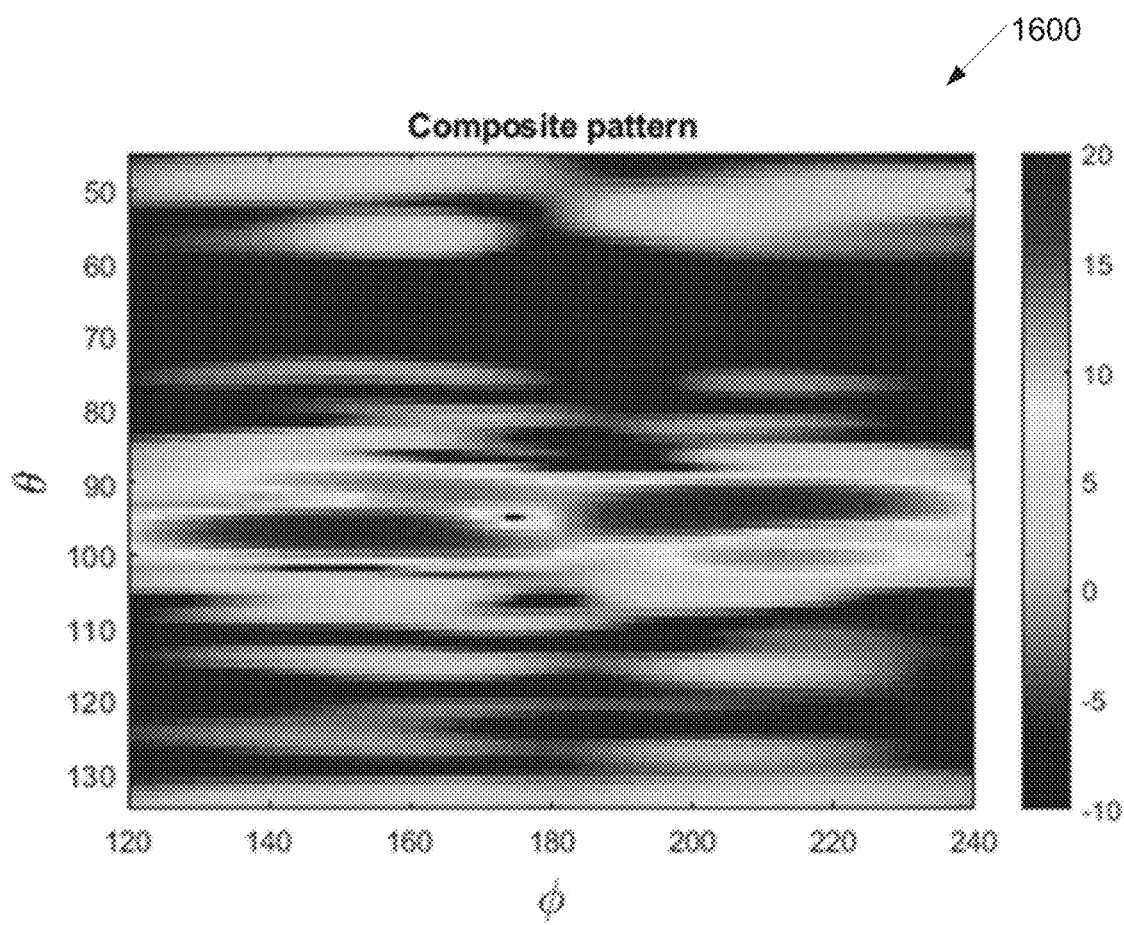
FIG. 16 illustrates an example Coverage map of the beam generated from the target coverage pattern according to embodiments of the present disclosure.

FIG. 16 illustrates an example coverage map of the beam generated from the target coverage pattern 1600 according to embodiments of the present disclosure. An embodiment of the coverage map of the beam generated from the target coverage pattern 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

Figure 17:
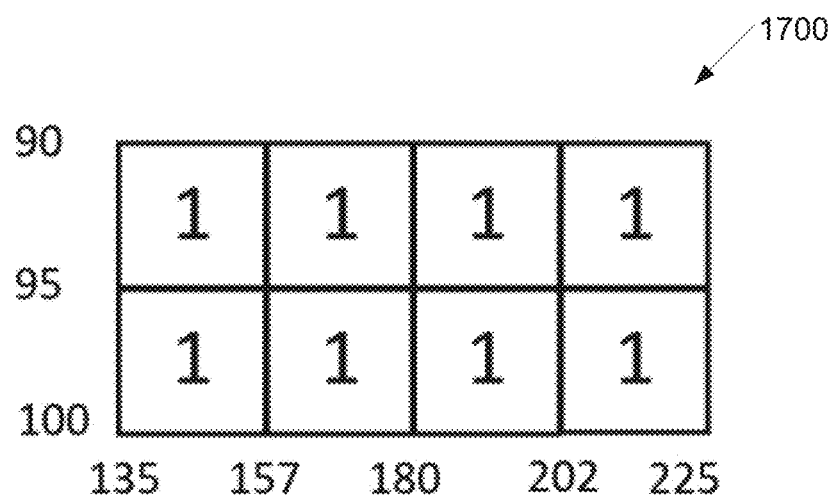
FIG. 17 illustrates an example target coverage pattern indicating a coverage plane targeting uniformly-distributed traffic according to embodiments of the present disclosure.

FIG. 17 illustrates an example target coverage pattern indicating a coverage plane targeting uniformly-distributed traffic 1700 according to embodiments of the present disclosure. An embodiment of the target coverage pattern indicating a coverage plane targeting uniformly-distributed traffic 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

Figure 18:
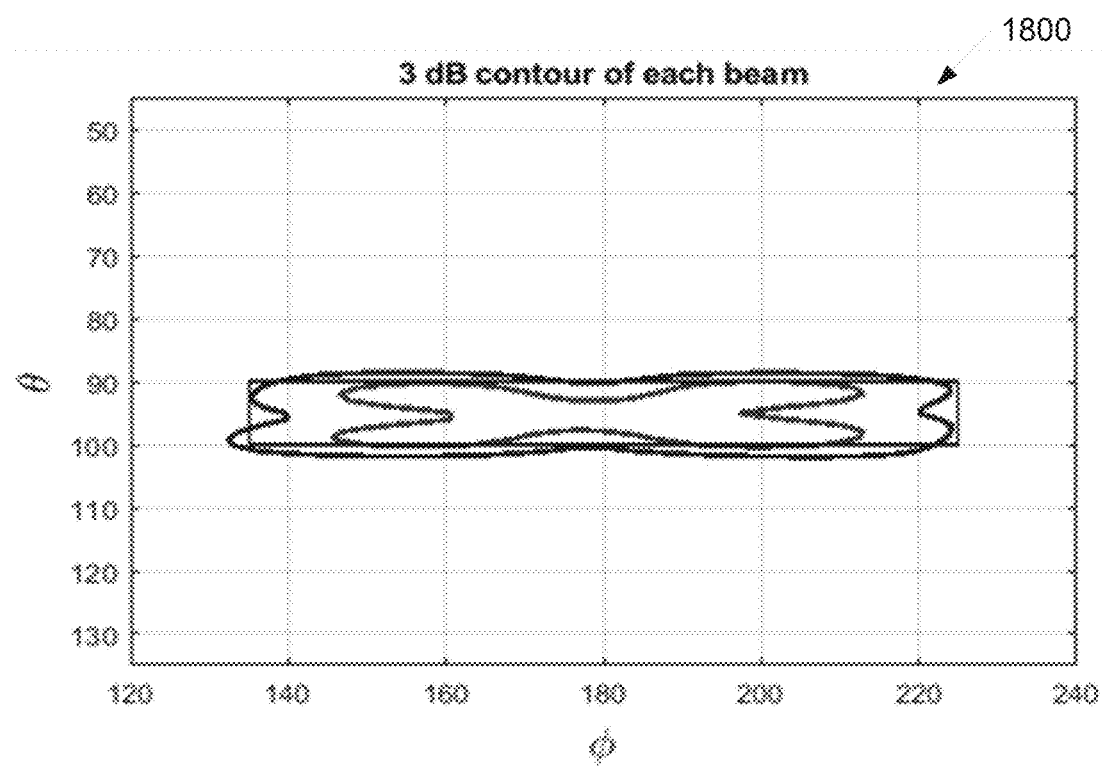
FIG. 18 illustrates an example coverage contours corresponding to the coverage pattern according to embodiments of the present disclosure.

FIG. 18 illustrates an example coverage contours corresponding to the coverage pattern 1800 according to embodiments of the present disclosure. An embodiment of the coverage contours corresponding to the coverage pattern 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

Figure 19:
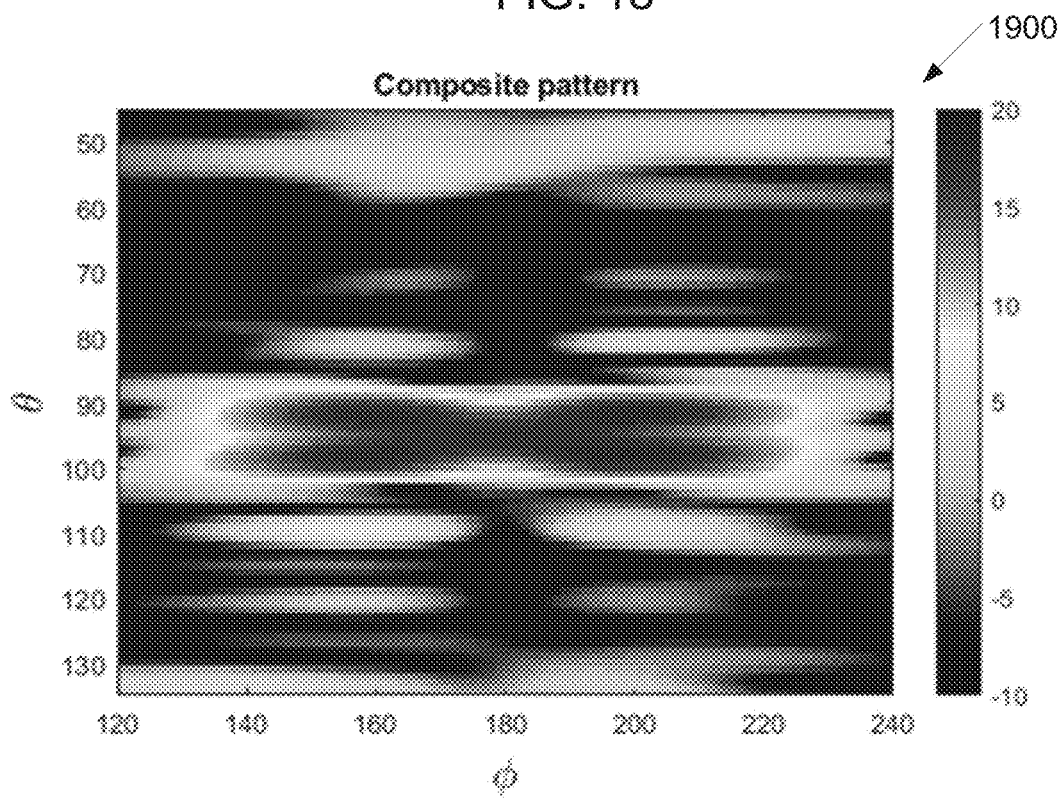
FIG. 19 illustrates an example coverage map corresponding to the coverage pattern according to embodiments of the present disclosure.

FIG. 19 illustrates an example coverage map corresponding to the coverage pattern 1900 according to embodiments of the present disclosure. An embodiment of the coverage map corresponding to the coverage pattern 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

In one embodiment, an eNB chooses one beam from a codebook based on SRS signaling. SRS can provide information about the angular direction (horizontal and azimuth) of each UE. Based on this information, the eNB can determine which angular directions contain UEs (traffic directions) and which angular directions do not contain UEs (coverage directions). One metric to select the beam to use is to select beam which can generate the optimal average antenna gain on the traffic direction. Another metric to select the beam is to select the beam which can optimize the gain on traffic direction meanwhile guarantee the gain on coverage directions is reduced within a threshold or maintained unreduced.

In one embodiment, an eNB chooses one beam from a codebook based on SRS and channel quality indicator (CQI) feedback. The selection of the beam depends on many parameters. One of those parameters is SRS which is a subband information sent from the UE to the eNB.

Another parameter is CQI that is also sent from the UE to the eNB and the CQI can be either subband or wideband information. SRS can provide information about the angular direction (horizontal and azimuth) of each UE. Based on this information, the eNB can determine which angular directions contain UEs (traffic directions) and which angular directions do not contain UEs (coverage directions). Moreover, using CQI information can give the eNB some information about the UEs who are well covered by the existing beam (UEs with high CQI values) and the UEs who need to have more coverage (UEs reporting lower CQI values). Combining this information, the eNB can choose the best beam that can be used as a common beam for the cell.

In another embodiment, the eNB also takes into account other KPIs to adjust the beam. One of those KPIs is coverage guarantee which means that even if there are some locations that do not have any users SRS was not received from these angular directions), a minimum amount of coverage has to be provided to those directions so that idle users can find coverage when the idle users become connected. Other KPIs (such as handover frequency, call drops, etc.) are also monitored and used in the decision of the selected beam.

In another embodiment, the beam selection includes initial beam selection and dynamic beam adaptation steps. In the initial beam selection step, the eNB could select the beam based on SRS and/or CQI following aforementioned procedures as shown in FIG. 20.

Figure 20:
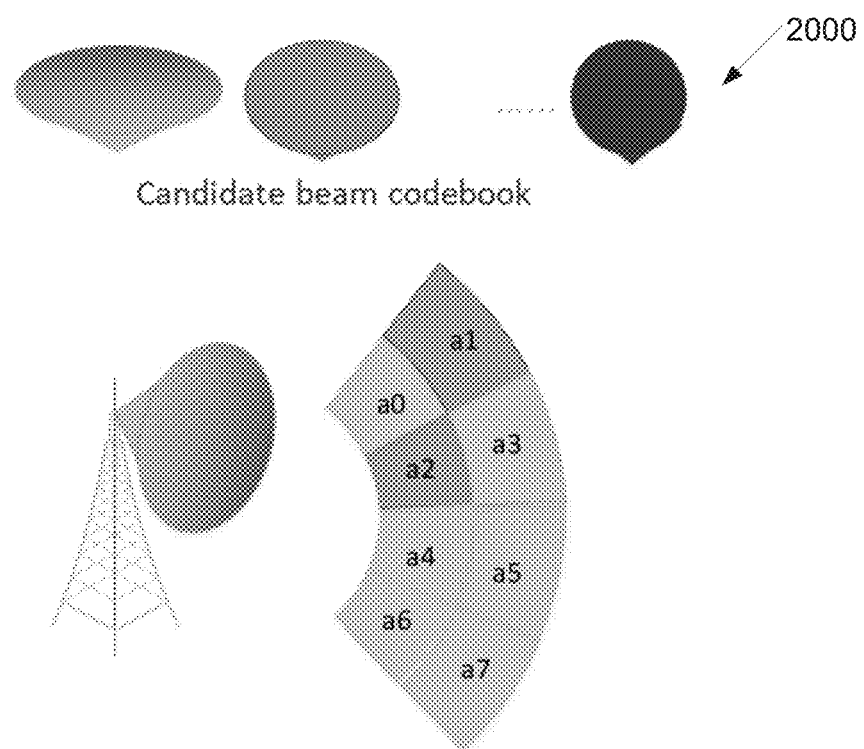
FIG. 20 illustrates an example initial beam selection according to embodiments of the present disclosure.

FIG. 20 illustrates an example initial beam selection 2000 according to embodiments of the present disclosure. An embodiment of the initial beam selection 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

In the beam adaptation step, after a new beam is applied, an eNB may keep monitoring the network KPIs including throughput, call drop rate, coverage and UE reports. If the KPI degrades larger than a threshold than the eNB may reconfigure the eNB to the previously used beam. Otherwise, the eNB could select a new beam following the beam bisector selection algorithms. In the beam bisector selection algorithm, an eNB may first select an angular grid and select a beam from to enhance the traffic performance on that grid. If the throughput performance is enhanced, then the eNB may decide that grid is a traffic grid, otherwise that grid is decided to be a coverage grid. After deciding the first grid, the eNB may continue to decide the next grid in the angular coverage domain until all grid has been decided to be either a traffic grid or coverage grid. These procedures are shown in FIGS. 21 and 22.

Figure 21:
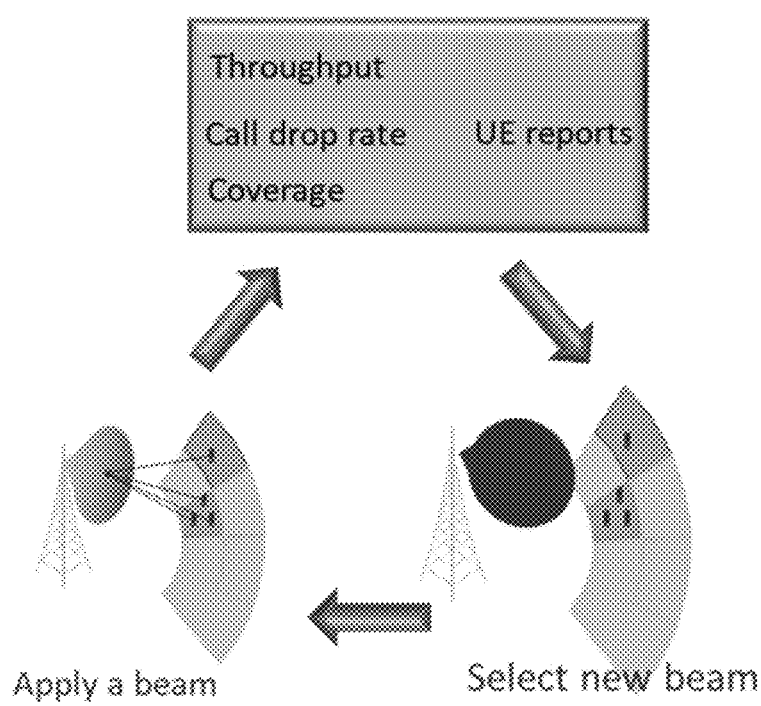
FIG. 21 illustrates an example beam selection according to embodiments of the present disclosure.

FIG. 21 illustrates an example beam selection 2100 according to embodiments of the present disclosure. An embodiment of the beam selection 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

Figure 22:
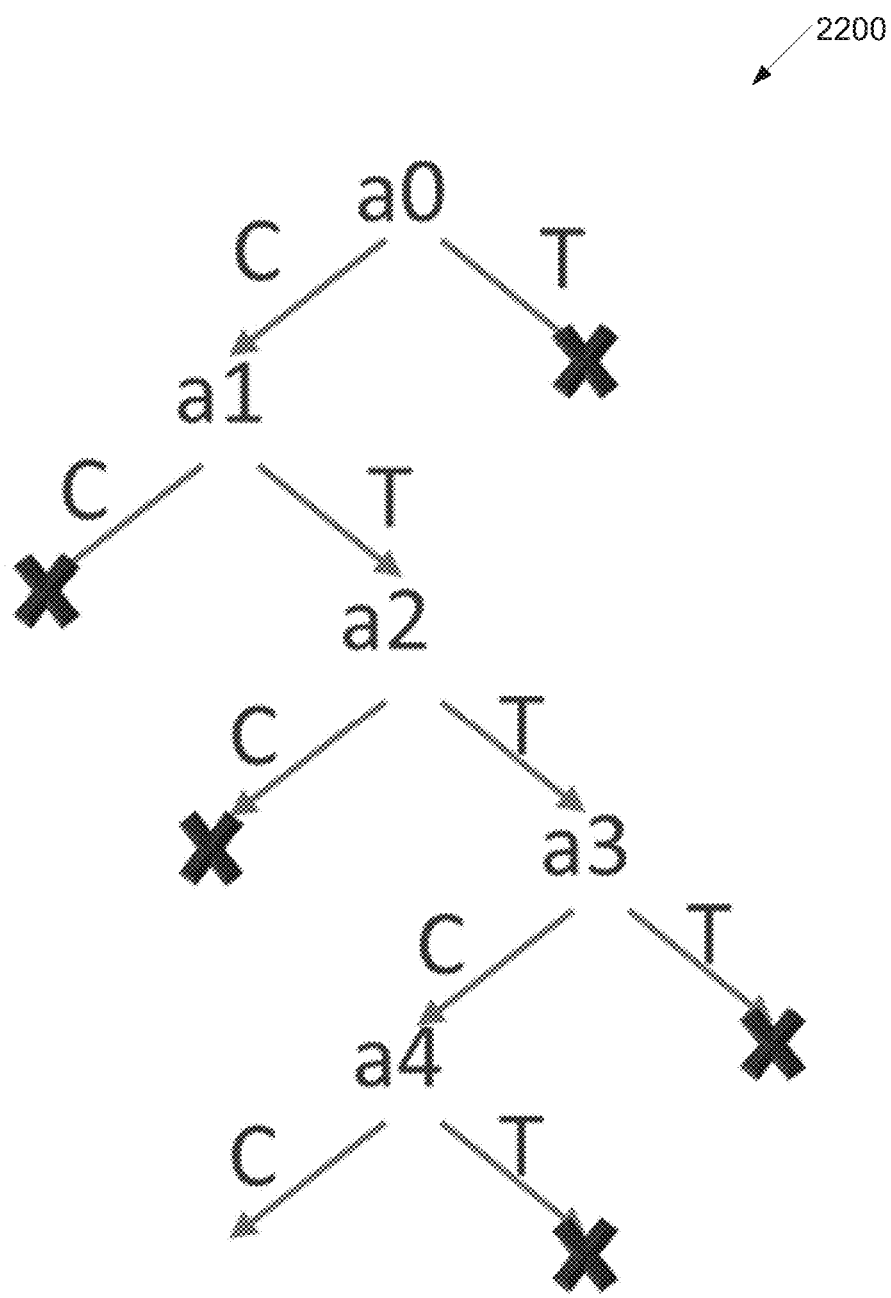
FIG. 22 illustrates an example bisector beam search algorithm according to embodiments of the present disclosure.

FIG. 22 illustrates an example bisector beam search algorithm 2200 according to embodiments of the present disclosure. An embodiment of the bisector beam search algorithm 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

In one embodiment, it is illustrated that how machine learning technique can be used to select the optimal common beam such that the best trade-off between the throughput of connected UEs and the coverage of the cell (including connected UEs and idle UEs) is achieved.

In one example of artificial intelligence (AI) method 1, classification based best beam selection is provided. As shown in figures, the training of classification model can be performed offline.

Figure 23:
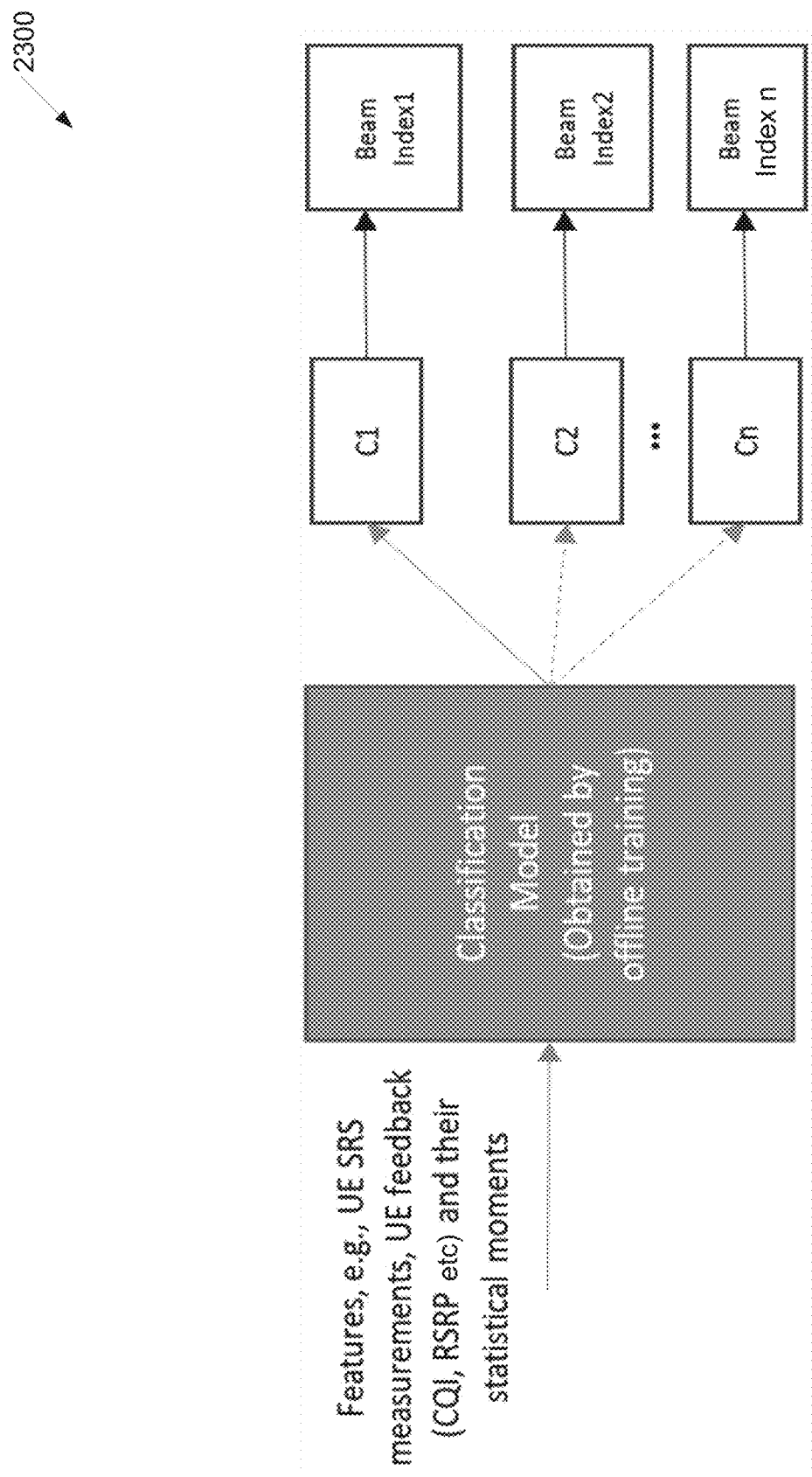
FIG. 23 illustrates an example classification based best beam selection according to embodiments of the present disclosure.

FIG. 23 illustrates an example classification based best beam selection 2300 according to embodiments of the present disclosure. An embodiment of the classification based best beam selection 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

In one embodiment of step 1-1, training model buildup is provided assuming that a finite number of code books is defined. Offline data may be used to classify the UEs based on the best beam indices in terms of optimizing the KPI metric of interest, i.e., a UE class 1 corresponds to the beam index 1, a UE class 2 corresponds to the beam index 2, etc. Multiple classification algorithm can be used, e.g., ridge, SVM, random forest, etc. The input features for UE classification could be the following but not limited to: UE SRS measurement and statistical moments of the UE SRS; and UE feedback (CQI, PMI, RI, RSRP) and statistical moments of the UE feedback.

In one embodiment of step 2-1, online selection is provided to uses the classification model obtained via offline training to classify the UEs and apply the corresponding beam indices for each UE category. Note that the trained UEs could include the connected UEs and/or idle UEs.

In one embodiment of AI method 2, RL learning enabled best beam selection (multi-independent state beam selection) is provided as shown in figure below.

Figure 24:
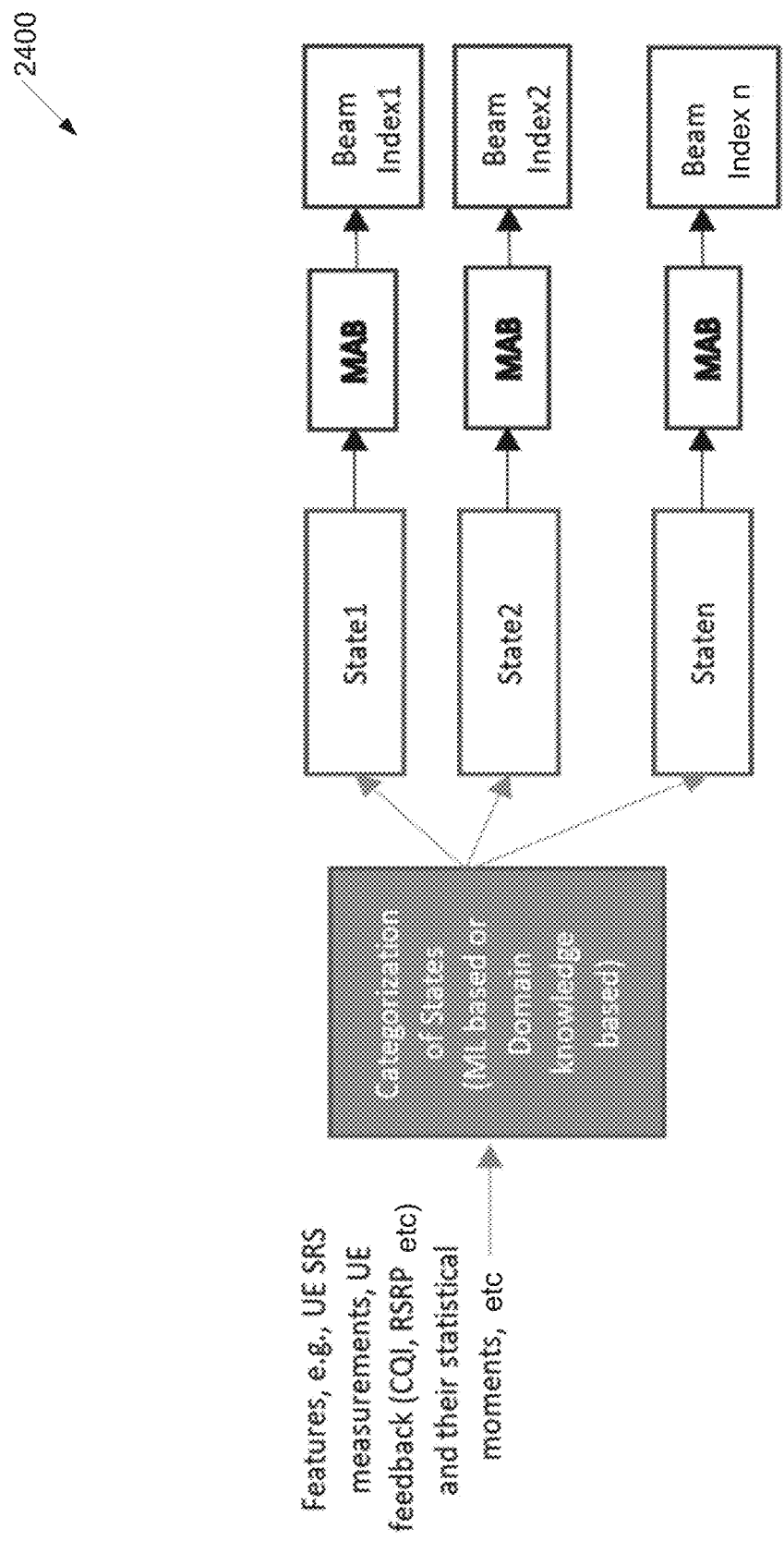
FIG. 24 illustrates an example MIS beam selection according to embodiments of the present disclosure.

FIG. 24 illustrates an example multi-independent state (MIS) beam selection 2400 according to embodiments of the present disclosure. An embodiment of the MIS beam selection 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions.

In one embodiment of step 2-1, offline classification is provided to use one composite function of multiple parameters to categorize UEs into multiple independent states. This classification can be accomplished by black box (using machine learning classification algorithm) or white box (using domain knowledge to define the classification metric. Different value of classification metric corresponds to different state).

The model of the reward is given as follows: Reward=$f$(State, Action) where State is a composite function of UE feedbacks and/or their statistical moments, etc. i.e., State=$g$(UE$_{feedbacks}$, UE$_{measurement}$).

Action space is the candidates of all predefined beam books or subset of beam books. Reward is the KPI of interest, e.g., UE throughput, capacity or coverage, predicated throughput (including both connected UEs and idle UEs).

In one embodiment of step 2-2, online reinforcement learning is provided within each state and multi-bandit arm (MAB) algorithm is employed to maximize the KPI metric of interest as shown in the above equation. Within each state, the action corresponds to the different beams. The beam candidates for each state could be same or different.

In one embodiment, an alternative of AI method 1, a beam selection facilitated by transfer learning enhanced classification is provided. Due to the mismatch of offline data and online data and dynamic change of UE/traffic distributions, transfer learning can be applied to further improve the accuracy of the classification of UEs. The updated training model based on online data can be used to classify UEs.

Figure 25:
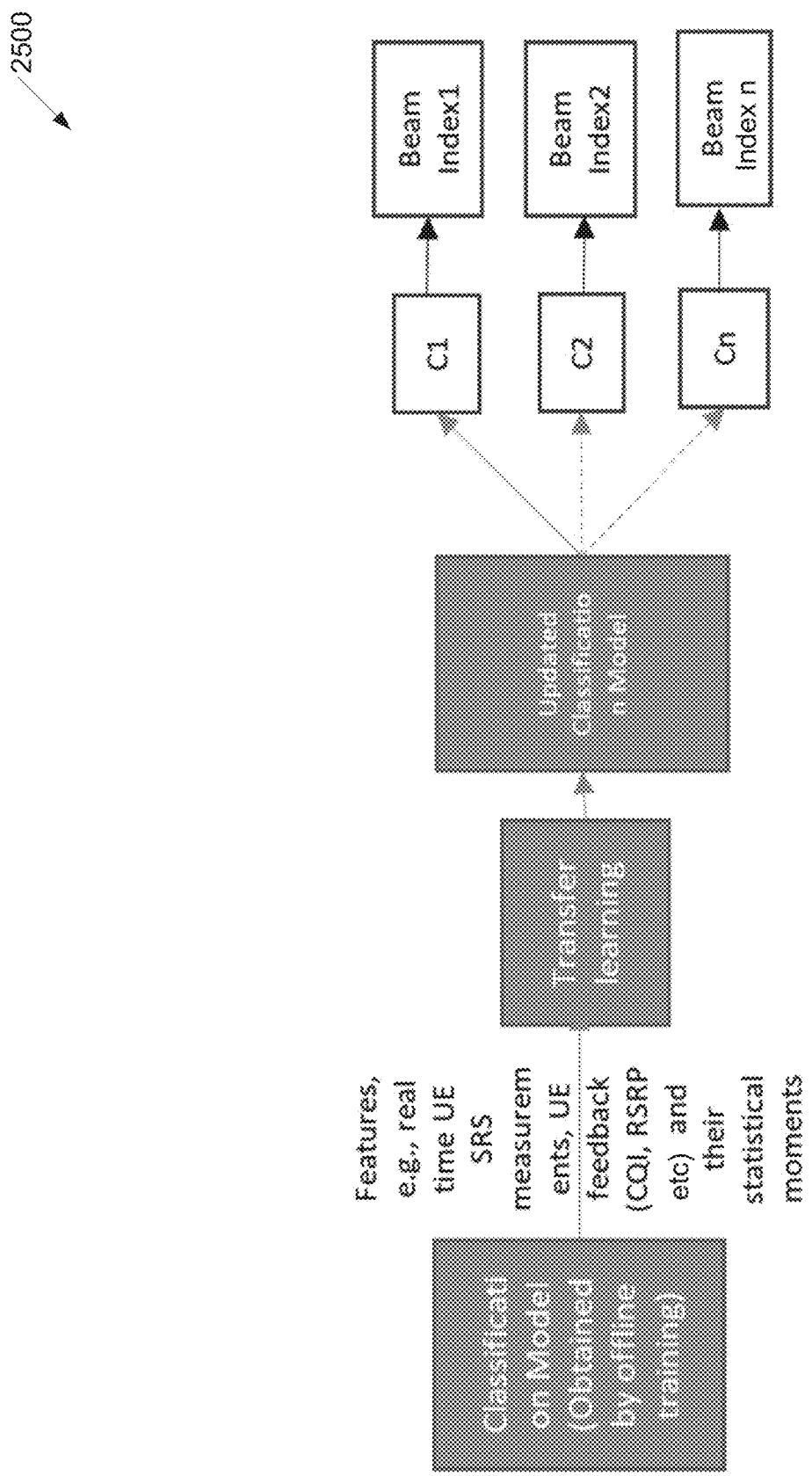
FIG. 25 illustrates an example beam selection facilitated by transfer learning enhanced classification according to embodiments of the present disclosure.

FIG. 25 illustrates an example beam selection facilitated by transfer learning enhanced classification 2500 according to embodiments of the present disclosure. An embodiment of the beam selection facilitated by transfer learning enhanced classification 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions.

In another embodiment, classification based beam selection with online adjustment is provided. Due to the mismatch of offline data and online data, the offset of best beam for each class of UEs can be calculated online. Then the best beam selection for each class of UEs can be adjusted by the offset calculated online. The offset for each class of UEs could be same or different.

Figure 26:
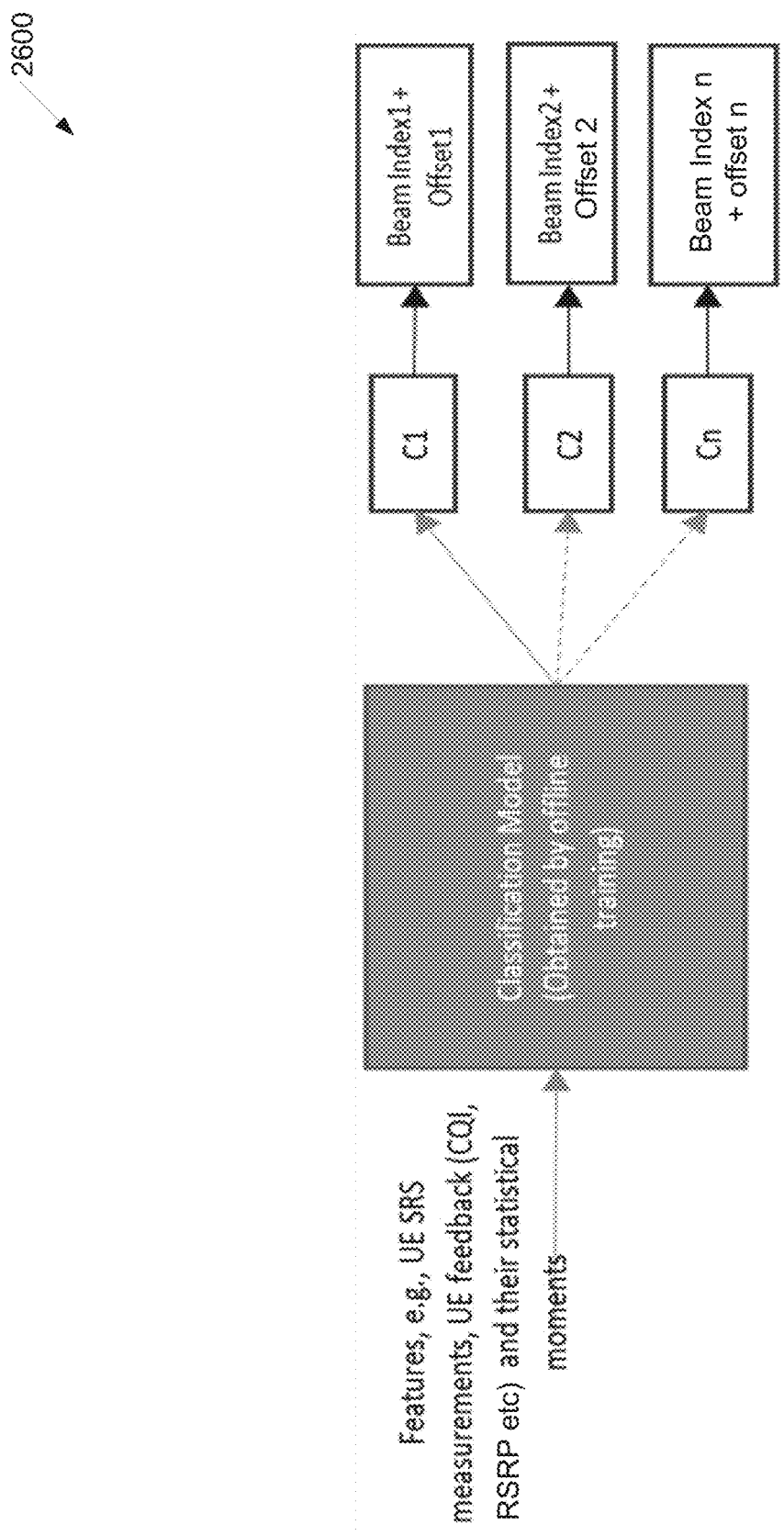
FIG. 26 illustrates an example classification based beam selection with online adjustment according to embodiments of the present disclosure.

FIG. 26 illustrates an example classification based beam selection with online adjustment 2600 according to embodiments of the present disclosure. An embodiment of the classification based beam selection with online adjustment 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions.

In one embodiment of AI method 2, a size of candidates of beam code books within each state is fixed. However, the candidates could be changed in real time, either some fixed shift of candidates or dynamic adjustment of the candidates. In another embodiment, a size of candidates of beam code books within each state is not same. The candidates could be dynamically changed as well. In yet another embodiment, a candidate of beam code books within each state could be same or different and changed over time.

Figure 27:
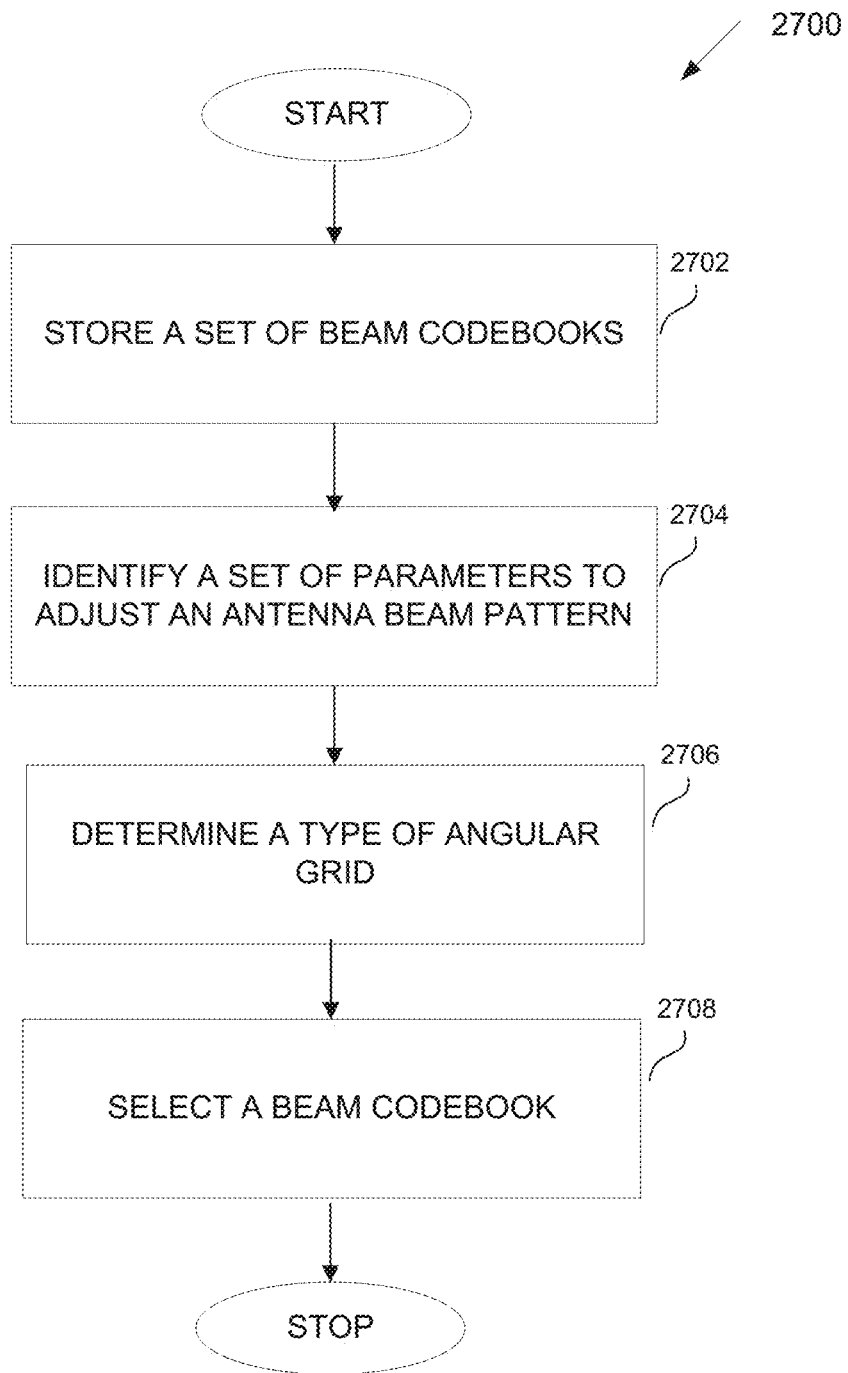
FIG. 27 illustrates a flow chart of a method for an antenna parameter configuration according to embodiments of the present disclosure.

FIG. 27 illustrates a flow chart of a method 2700 for an antenna parameter configuration according to embodiments of the present disclosure, as may be performed by a BS (e.g., 101-103 as illustrated in FIG. 1). An embodiment of the method 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions.

As illustrated in FIG. 27, the method 2700 begins at step 2702. In step 2702, the BS stores a set of beam codebooks including a plurality of angular grids each of which is identified as a first type of angular grid or a second type of angular grid based on a cell angular domain of a cell belonging to the BS.

In step 2704, the BS identifies a set of parameters to adjust an antenna beam pattern based on the set of beam codebooks, wherein the set of parameters includes at least one of feedback information received from a UE or a set of KPIs identified by the BS.

In step 2704, the set of KPIs includes at least one of a network throughput, a call drop rate, or a number of RRC connected UEs, and the feedback information received from the UE includes at least one of a CQI, a rank indicator (RI), reference signal received power (RSRP) information, reference signal received quality (RSRQ) information, or a SRS.

In step 2706, the BS determines, based on the set of parameters, a type of angular grid as the first type of angular grid or the second type of angular grid, wherein the first and second type of angular grids include a first antenna gain and a second antenna gain, respectively.

In step 2708, the BS selects a beam codebook, based on the type of angular grid, from the set of beam codebooks, the beam codebook corresponding to the antenna beam pattern.

In one embodiment, the BS identifies the cell angular domain including a high-traffic, traffic grid and a low-traffic, coverage grid, identifies a cell azimuth angular domain including N angles, and identifies a cell elevation angular domain including M angles. In such embodiment, a total of MN grids covers the cell angular domain of the cell.

In one embodiment, the BS identifies the type of angular grid based on an AoA that is determined based on a sounding reference signal or a measurement report received from the UE and assigns a value to each of the plurality of angular grids, the value being increased if the AoA is identified in the plurality of angular grids during a predefined time period.

In one embodiment, the BS determines the type of angular grid as a high-traffic, traffic grid if the value is greater than a predefined threshold or determines the type of angular grid as a low-traffic, coverage grid if the value is less than or equal to the predefined threshold.

In one embodiment, the BS identifies a beam metric based on a weighted antenna gain. In such embodiment, the beam codebook corresponds to the antenna beam pattern such that the beam metric over the first type of angular grid is maximized and the beam metric over the second type of angular grid is reduced within a predefined threshold.

In one embodiment, the BS determines whether the set of KPIs is updated after selecting the beam codebook corresponding to the first type of angular grid, based on the set of KPIs being updated in a first manner, determines the first type of angular grid as a high-traffic, traffic grid, and based on the set of KPIs being updated in a second manner, determines the first type of angular grid as low-traffic, coverage grid. In such embodiment, the beam codebook corresponds to the antenna beam pattern such that an antenna beam gain over the first type of angular grid is maximized.

In one embodiment, the BS determines whether the set of KPIs is updated after selecting the beam codebook corresponding to the second type of angular grid and the first type of angular grid, based on the set of KPIs being updated in a first manner, determining the second type of angular grid as a high-traffic, traffic grid, and based on the set of KPIs being updated in a second manner, determining the second type angular grid as low-traffic, coverage grid. In such embodiment, the beam codebook corresponds to the antenna beam pattern such that a weighted antenna gain for the second type of angular grid and the first type of angular grid is maximized.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
   a transceiver;
   memory operably connected to the transceiver, the memory configured to store a set of beam codebooks including a plurality of angular grids each of which is identified as a first type of angular grid or a second type of angular grid based on a cell angular domain of a cell belonging to the BS, wherein the first type of angular grid and the second type of angular grid are based on a traffic intensity of the cell; and
   a processor operably connected to the transceiver and the memory, the processor configured to:
      identify a set of parameters to adjust an antenna beam pattern based on the set of beam codebooks, wherein the set of parameters includes at least one of feedback information received from a user equipment (UE) or a set of key performance indicators (KPIs) identified by the BS;
      determine, based on the set of parameters, a type of angular grid as the first type of angular grid or the second type of angular grid, wherein the first and second type of angular grids include a first antenna gain and a second antenna gain, respectively; and
      select a beam codebook, based on the type of angular grid, from the set of beam codebooks, the beam codebook corresponding to the antenna beam pattern.

2. The BS of claim 1, wherein the processor is further configured to:
   identify the cell angular domain including a high-traffic, traffic grid and a low-traffic, coverage grid;
   identify a cell azimuth angular domain including N angles; and
   identify a cell elevation angular domain including M angles,
   wherein a total of MN grids covers the cell angular domain of the cell.

3. The BS of claim 1, wherein the processor is further configured to:

identify the type of angular grid based on an angle of arrival (AoA) that is determined based on a sounding reference signal or a measurement report received from the UE; and assign a value to each of the plurality of angular grids, the value being increased if the AoA is identified in the plurality of angular grids during a predefined time period.

4. The BS of claim 3, wherein the processor is further configured to:

determine the type of angular grid as a high-traffic, traffic grid if the value is greater than a predefined threshold; or determine the type of angular grid as a low-traffic, coverage grid if the value is less than or equal to the predefined threshold.

5. The BS of claim 1, wherein the processor is further configured to:

identify a beam metric based on a weighted antenna gain; and select, from the set of beam codebooks, the beam codebook corresponding to the antenna beam pattern such that the beam metric over the first type of angular grid is maximized and the beam metric over the second type of angular grid is reduced within a predefined threshold.

6. The BS of claim 1, wherein:

the set of KPIs includes at least one of a network throughput, a call drop rate, or a number of radio resource control (RRC) connected UEs; and the feedback information received from the UE includes at least one of a channel quality indicator (CQI), a rank indicator (RI), reference signal received power (RSRP) information, reference signal received quality (RSRQ) information, or a sounding reference signal (SRS).

7. The BS of claim 1, wherein the processor is further configured to:

select, from the set of beam codebooks, the beam codebook corresponding to the antenna beam pattern such that an antenna beam gain over the first type of angular grid is maximized;

determine whether the set of KPIs is updated after selecting the beam codebook corresponding to the first type of angular grid;

based on the set of KPIs being updated in a first manner, determine the first type of angular grid as a high-traffic, traffic grid; and based on the set of KPIs being updated in a second manner, determine the first type of angular grid as low-traffic, coverage grid.

8. The BS of claim 7, wherein the processor is further configured to:

select, from the set of beam codebooks, the beam codebook corresponding to the antenna beam pattern such that a weighted antenna gain for the second type of angular grid and the first type of angular grid is maximized;

determine whether the set of KPIs is updated after selecting the beam codebook corresponding to the second type of angular grid and the first type of angular grid;

based on the set of KPIs being updated in a first manner, determine the second type of angular grid as a high-traffic, traffic grid; and based on the set of KPIs being updated in a second manner, determine the second type angular grid as low-traffic, coverage grid.

9. A method of a base station in a wireless communication system, the method comprising:

storing a set of beam codebooks including a plurality of angular grids each of which is identified as a first type of angular grid or a second type of angular grid based on a cell angular domain of a cell belonging to the BS, wherein the first type of angular grid and the second type of angular grid are based on traffic intensity of the cell;

identifying a set of parameters to adjust an antenna beam pattern based on the set of beam codebooks, wherein the set of parameters includes at least one of feedback information received from a user equipment (UE) or a set of key performance indicators (KPIs) identified by the BS;

determining, based on the set of parameters, a type of angular grid as the first type of angular grid or the second type of angular grid, wherein the first and second type of angular grids include a first antenna gain and a second antenna gain, respectively; and selecting a beam codebook, based on the type of angular grid, from the set of beam codebooks, the beam codebook corresponding to the antenna beam pattern.

10. The method of claim 9, further comprising:

identifying the cell angular domain including a high-traffic, traffic grid and a low-traffic, coverage grid;

identifying a cell azimuth angular domain including N angles; and identifying a cell elevation angular domain including M angles, wherein a total of MN grids covers the cell angular domain of the cell.

11. The method of claim 9, further comprising:

identifying the type of angular grid based on an angle of arrival (AoA) that is determined based on a sounding reference signal or a measurement report received from the UE; and assigning a value to each of the plurality of angular grids, the value being increased if the AoA is identified in the plurality of angular grids during a predefined time period.

12. The method of claim 11, further comprising:

determining the type of angular grid as a high-traffic, traffic grid if the value is greater than a predefined threshold; or determining the type of angular grid as a low-traffic, coverage grid if the value is less than or equal to the predefined threshold.

13. The method of claim 9, further comprising:

identifying a beam metric based on a weighted antenna gain; and wherein selecting the beam codebook comprises selecting, from the set of beam codebooks, the beam codebook corresponding to the antenna beam pattern such that the beam metric over the first type of angular grid is maximized and the beam metric over the second type of angular grid is reduced within a predefined threshold.

14. The method of claim 9, wherein:

the set of KPIs includes at least one of a network throughput, a call drop rate, or a number of radio resource control (RRC) connected UEs; and the feedback information received from the UE includes at least one of a channel quality indicator (CQI), a rank indicator (RI), reference signal received power (RSRP) information, reference signal received quality (RSRQ) information, or a sounding reference signal (SRS).

15. The method of claim 9, wherein selecting the beam codebook comprises selecting, from the set of beam codebooks, the beam codebook corresponding to the antenna beam pattern such that an antenna beam gain over the first type of angular grid is maximized, the method further comprising:
  determining whether the set of KPIs is updated after selecting the beam codebook corresponding to the first type of angular grid;
  based on the set of KPIs being updated in a first manner, determining the first type of angular grid as a high-traffic, traffic grid; and
  based on the set of KPIs being updated in a second manner, determining the first type of angular grid as low-traffic, coverage grid.

16. The method of claim 15, wherein selecting the beam codebook comprises selecting, from the set of beam codebooks, the beam codebook corresponding to the antenna beam pattern such that a weighted antenna gain for the second type of angular grid and the first type of angular grid is maximized, wherein the method further comprises:
  determining whether the set of KPIs is updated after selecting the beam codebook corresponding to the second type of angular grid and the first type of angular grid;
  based on the set of KPIs being updated in a first manner, determining the second type of angular grid as a high-traffic, traffic grid; and
  based on the set of KPIs being updated in a second manner, determining the second type angular grid as low-traffic, coverage grid.

17. A non-transitory computer-readable medium comprising program code, that when executed by at least one processor, causes an electronic device to:
  store a set of beam codebooks including a plurality of angular grids each of which is identified as a first type of angular grid or a second type of angular grid based on a cell angular domain of a cell belonging to the BS, wherein the first type of angular grid and the second type of angular grid are based on traffic intensity of the cell;
  identify a set of parameters to adjust an antenna beam pattern based on the set of beam codebooks, wherein the set of parameters includes at least one of feedback information received from a user equipment (UE) or a set of key performance indicators (KPIs) identified by the BS;
  determine, based on the set of parameters, a type of angular grid as the first type of angular grid or the second type of angular grid, wherein the first and second type of angular grids include a first antenna gain and a second antenna gain, respectively; and
  select a beam codebook, based on the type of angular grid, from the set of beam codebooks, the beam codebook corresponding to the antenna beam pattern.

18. The non-transitory computer-readable medium of claim 17, further comprising program code, that when executed by at least one processor, causes an electronic device to:
  identify the cell angular domain including a high-traffic, traffic grid and a low-traffic, coverage grid;
  identify a cell azimuth angular domain including N angles; and
  identify a cell elevation angular domain including M angles,
  wherein a total of MN grids covers the cell angular domain of the cell.

19. The non-transitory computer-readable medium of claim 17, further comprising program code, that when executed by at least one processor, causes an electronic device to:
  identify the type of angular grid based on an angle of arrival (AoA) that is determined based on a sounding reference signal or a measurement report received from the UE; and
  assign a value to each of the plurality of angular grids, the value being increased if the AoA is identified in the plurality of angular grids during a predefined time period.

20. The non-transitory computer-readable medium of claim 19, further comprising program code, that when executed by at least one processor, causes an electronic device to:
  determine the type of angular grid as a high-traffic, traffic grid if the value is greater than a predefined threshold; or
  determine the type of angular grid as a low-traffic, coverage grid if the value is less than or equal to the predefined threshold.

* * * * *